US006323934B1

(12) United States Patent
Enomoto

(10) Patent No.: US 6,323,934 B1
(45) Date of Patent: *Nov. 27, 2001

(54) IMAGE PROCESSING METHOD AND APPARATUS

(75) Inventor: Jun Enomoto, Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,292

(22) Filed: Dec. 4, 1998

(30) Foreign Application Priority Data

| Dec. 4, 1997 | (JP) | 9-333943 |
| Dec. 9, 1997 | (JP) | 9-338511 |
| Feb. 23, 1998 | (JP) | 10-040177 |
| Mar. 11, 1998 | (JP) | 10-059454 |

(51) Int. Cl.$^7$ .......... G03B 27/52; G03B 27/32; G03B 27/68; H04N 1/04; G06K 9/32

(52) U.S. Cl. .......... 355/40; 355/32; 355/38; 355/52; 358/487; 358/506; 382/298; 382/299; 382/300

(58) Field of Search .......... 355/32, 38, 40, 355/52; 358/487, 506; 382/298, 299, 300

(56) References Cited

U.S. PATENT DOCUMENTS

| 5,604,825 | * | 2/1997 | Hirota et al. .......... 358/451 |
| 5,917,578 | * | 6/1999 | Nakamura .......... 355/40 |
| 5,990,947 | * | 11/1999 | Okino et al. .......... 348/240 |
| 6,005,987 | * | 12/1999 | Nakamura et al. .......... 382/294 |

* cited by examiner

Primary Examiner—Russell Adams
Assistant Examiner—Khaled Brown

(57) ABSTRACT

An image processing method in which at least one aberration of an optically recorded image selected from among lateral chromatic aberration, distortion, decrease in the brightness of the edge of image field and image blurring is corrected based on lens characteristics of a taking lens and position information of the image. Additionally, an image processing apparatus comprises an acquiring section for acquiring information identifying a taking lens; a storage section for storing lens characteristics associated with the type of the taking lens; and a correcting section which receives the corresponding lens characteristics of the taking lens from the storage section and corrects at least one aberration selected from among lateral chromatic aberration, distortion, decrease in the brightness of the edge of image field and image blurring. High-quality images that are free from color mismatch, distortion, uneven brightness, blurring and any other defects, or both vignetting and distortion can be outputted consistently. These high-quality images can be also displayed on an image display device, thus allowing the operator to perform verification and achieve consistent outputting of image-carrying prints.

40 Claims, 13 Drawing Sheets

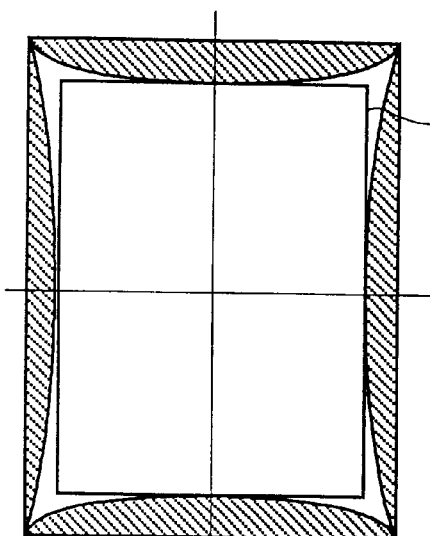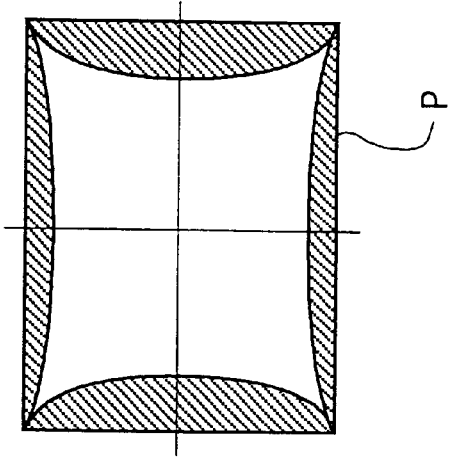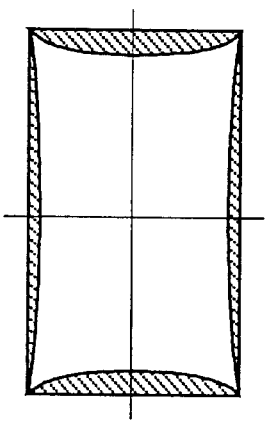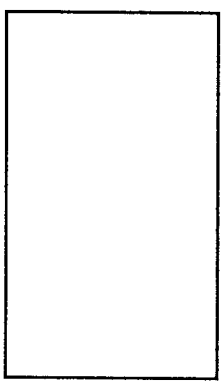

IMAGE PROCESSING METHOD AND APPARATUS

BACKGROUND OF THE INVENTION

This invention relates to the technical field of an image processing method for use in digital photoprinters and the like which obtain digital image data from an optically recorded image by, for example, photoelectrically reading the image recorded on a film, or which directly obtain digital image data by recording the image of a subject and which obtain an image reproducing print (for photo) on the basis of the digital image data. The process is particularly intended to correct various defects such as lateral chromatic aberration, distortion, decrease in the brightness of the edge of image field and a defocused image that develop in the image recorded with a film with lens, an inexpensive compact camera or a digital camera and so forth. The invention also relates to the technical field of an image processing apparatus that makes use of this image processing method.

Currently, the image recorded on a photographic film such as a negative film or a reversal film (which are hereinafter collectively referred to as "film") is printed to a light-sensitive material (photographic paper) by "direct exposure" (or analog exposure), in which the image on a film is projected onto the light-sensitive material to perform areal exposure.

A printer that relies upon digital exposure has recently been commercialized. Called a "digital photoprinter", the apparatus operates as follows The image recorded on a film is read photoelectrically; the image is then converted to a digital signal and subjected to various image processing steps to produce recording image data; a light-sensitive material is exposed by scanning with recording light modulated in accordance with the image data, whereby an image (latent image) is recorded; and the necessary processing is done to produce a (finished) print.

In the digital photoprinter, the image recorded on a film is converted to digital image data, which is then processed to determine the conditions for exposure to be performed in printing; hence, the correction of drop-outs or blocked-ups in image due to photography with rear light or an electronic flash, sharpening, the correction of color or density failure, the correction of under-exposure or over-exposure or the correction of insufficiency of the brightness of the edge of image field can be effectively performed to produce prints of very high quality that have heretofore been unattainable by conventional direct exposure. What is more, by image data processing, a plurality of images can be assembled into one composite image or a single image can be divided into more than one image and even characters can be assembled; thus, prints can be outputted after editing/processing is done in accordance with a specific use.

A further advantage of the digital photoprinter is that prints can also be prepared from the image (image data) taken with an imaging device such as a digital camera. The desired image can not only be outputted as a print (photo); the image data can also be supplied to a computer or stored in a recording medium such as a floppy disk; thus, the image data can be utilized in various applications other than photography.

Having these capabilities, the digital photoprinter is basically composed of a scanner (image reading apparatus) for photoelectric reading of the image recorded on a film, an image processing apparatus that performs image processing on the thus read image to produce recording image data (conditions for exposure) and a printer (image recording apparatus) that performs scan exposure on a light-sensitive material in accordance with the image data and which performs development and other necessary steps to produce a print.

In the scanner, reading light issuing from a light source is allowed to be incident on the film to produce projected light carrying the image recorded on the film and the projected light is focused on an image sensor such as a CCD sensor, whereby photoelectric conversion is effected to read the image from the film; after optionally being subjected to various image processing steps, image data from the film (image data signal) is sent to the image processing apparatus.

The image processing apparatus sets the conditions for image processing on the basis of the image data that has been read with the scanner; the apparatus then performs image processing on the image data in accordance with the thus set conditions and supplies the printer with output image data (exposure conditions) for image recording.

In the printer, if it is of a type that relies upon exposure by scanning with light beams, the latter are modulated in accordance with the image data sent from the image processing apparatus and the light-sensitive material is exposed by two-dimensional scanning to form a latent image, which in turn is subjected to development and other specified processing steps, thereby producing a print (photograph) reproducing the image recorded on the film.

When the image recorded on a film or taken with a digital camera or a compact camera is reproduced on a print, various factors come into play to deteriorate the image quality and they are aberrations that are caused by the poor performance of the lens fitted on the camera used to record or take the image, such as lateral chromatic aberration, distortion, decrease in the brightness of the edge of image field and defocusing of the image.

A color image is formed of three primary colors, red (R), green (G) and blue (B) and due to the slight wavelength-dependent differences in the refractive index of the lens, the imaging magnification of the three light components, R, G and B, varies to cause "lateral chromatic aberration". As a result, the image recorded on a film will have a color mismatch upon reproduction.

In order to record an appropriate or satisfactory image, a plane of a scene of interest normal to the optical axis must be imaged on an identical plane or imaging plane that is normal to the optical axis. In fact, however, ordinary lenses have an aberration called "distortion", or displacement of the imaging plane with respect to the optical axis, and the resulting distortion of the image on the imaging plane causes a problem in that the image recorded on a film is distorted upon reproduction.

Other causes of image deterioration that depend on the performance of the lens used are the decrease in the brightness of the edge of image field, or the image from either edge of the lens being darker than that from the central area, and defocusing, or the production of a blurred image due to the varying focus position across the plane of the film.

If comparatively high cost can be spent to manufacture cameras as in the case of a single reflex lens camera, high-precision lenses may be employed and optionally a plurality of lens elements may be combined to record an appropriate image on the film by correcting various lens aberrations including lateral chromatic aberration, distortion, decrease in the brightness of the edge of image field and defocusing of image.

On the other hand, a film with lens and an inexpensive compact camera do not justify high cost and lens aberrations such as lateral chromatic aberration and distortion will occur in the image recorded on the film. As the result, the image reproduced in a print will have various defects such as color mismatch, distortion, unevenness in brightness and blurring.

FIG. 13 shows how the image on a film is processed with a conventional digital photoprinter and outputted as a finished print. As shown, the image on a film is scanned with a scanner to read high-resolution, fine scanned image data, which is subsequently subjected to predetermined image processing and setup steps in an image processing apparatus; this is not followed by image displaying but the processed image data is immediately fed into a printer which outputs a finished print. If the image on a film that involves aberrations such as lateral chromatic aberration and distortion is processed by the stated procedure, the aberrations are not effectively corrected and the reproduced image on the print will have a color mismatch and distortion.

As also shown in FIG. 13, print outputting from the conventional photoprinter is preceded by prescanning of the image on a film with the scanner to produce low-resolution, prescanned image data, which is displayed as such on a monitor (i.e., an image display device); alternatively, fine scanning is directly performed in place of prescanning so as to produce high-resolution, fine-scanned image data, which is displayed on the monitor after removing portions of it or effecting size reduction. Whichever is the case, aberrations such as lateral chromatic aberration and distortion in the image data are not corrected and the image displayed on the monitor also has a color mismatch and distortion.

To deal with this problem, the user may verify the color mismatch and distortion in the displayed image and manually correct the lateral chromatic distortion and distortion. However, positively verifying these aberrations from the displayed image and manually applying the appropriate correction to the image data are extremely difficult even for a skilled user; even if aberrations are successfully corrected, a phenomenon called vignetting to be described later will occur in the corrected image, and it is extremely difficult to achieve correct verification of the range of vignetting that results from the correction of aberrations. What is more, in order to produce a print that is properly corrected for the aberrations and which has an appropriate print area reproduced thereon, print outputting must be repeated with small variations in the amount of correction; however, this is quite cumbersome and, in addition, the printing cost is increased.

If the information about the lenses used to take a picture of a subject or their characteristics are known in the conventional image processing apparatus, it would be possible to correct lateral chromatic aberration, distortion and other kinds of aberrations in accordance with the characteristics of the taking lenses. In fact, however, there is no established method of correcting aberrations and if one wants to perform the actual correction, many trials and errors are necessary before the appropriate result is attained and this has been a quite cumbersome job. If the information about the taking lenses or their characteristics are not known, it is even more difficult to correct the aberrations and producing the most effectively corrected image has been extremely difficult.

SUMMARY OF THE INVENTION

The present invention accounts for these circumstances and provides an image processing method by which even the image recorded on a film with lens, or taken with an inexpensive compact camera or a digital camera can be effectively processed to correct lens aberrations such as lateral chromatic aberration, distortion, decrease in the brightness of the edge of image field and defocusing. Thus a high-quality image that is free from color mismatch, distortion, uneven brightness of the edge of image field, blurring and any other defects is output.

Another object of the present invention is to provide an image processing apparatus that makes use of this image processing method.

A further object of the present invention is to provide an image processing method by which even the image recorded on a film with lens or taken with an inexpensive compact camera or a digital camera can be effectively processed to correct distortion, lateral chromatic aberration and other lens aberrations. Thus an image is produced that is free from any distortion, color mismatch and other defects, and is displayed on a monitor device together with a print area, or only the aberration-corrected area in agreement with the print area. Further, the range of vignetting due to the aberrational correction is clearly delineated on the monitor device to reproduce a print image that has been corrected for lateral chromatic aberration, distortion and other lens aberrations to achieve agreement with the image displayed within the displayed print area or with the displayed image solely consisting of the print area.

A still further object of the present invention is to provide an image processing apparatus that makes use of this image processing method.

Another object of the present invention is to provide an image processing method wherein even if aberration characteristics for the image recorded on a film with lens or taken with an inexpensive compact camera or a digital camera are not obtained from the information about the lenses or film used to take the picture, the aberration characteristics of interest can be detected on the basis of the data for the recorded image. For example, the image displayed on a monitor device using such image data, with the detected aberration characteristics being utilized in subsequent image processing to correct lateral chromatic aberration, distortion and other lens aberrations, ensures that a high-quality image optimally, corrected for aberrations to become free of color mismatch, distortion and other defects, is reproduced as a print image.

Yet another object of the present invention is to provide an image processing apparatus that makes use of this image processing method.

In order to attain the above objects, the invention provides an image processing method comprising the steps of obtaining input image data from an image recorded optically with a taking lens and applying specified image processing to the obtained input image data to produce output image data that can be reproduced as a visible image, in which at least one aberration of said optically recorded image selected from among lateral chromatic aberration, distortion, decrease in the brightness of the edge of image field and image blurring is corrected based on lens characteristics of said taking lens and position information of said image.

Preferably, the position information of said image is pixel position information of said recorded image.

Preferably, the position information of said image is referenced to an optical axis of said taking lens used in recording of said image.

Preferably, the lens characteristics of said taking lens is obtained from separately acquired information about the taking lens used to record said image.

Preferably, correction of said distortion of said image is accompanied by electronic scaling at a higher-than-steady ratio.

Preferably, said higher-than-steady ratio is sufficient to cancel image dropout resulting from the correction of said distortion.

Preferably, said visible image is both a printed image and a displayed image and at least said output image data is both image data for outputting said printed image from a printer and image data for display on an image display device, both of said image data being subjected to the correction of said at least one aberration selected from among lateral chromatic aberration, distortion, decrease in the brightness of the edge of image field and image blurring.

The invention also provides an image processing method comprising the steps of obtaining input image data from an image recorded optically with a taking lens and applying specified image processing to the obtained input image data to produce output image data, in which at least one aberration characteristic selected from lateral chromatic aberration characteristic and distortion characteristic of said taking lens is detected based on said input image data and at least one aberration selected from said lateral chromatic aberration and said distortion is corrected based on the detected aberration characteristic and position information of said image.

Preferably, said aberration characteristic is detected by the steps of displaying said image on an image display device based on said input image data, obtaining at least two points of the position information that specify a subject to be corrected for said at least one aberration that is selected from the image displayed on said image display device, extracting said subject between said at least two points based on said input image data, acquiring the position information of said subject before said at least one aberration is corrected, also acquiring the corrected position information of said subject as predictable between said at least two points and calculating an aberration equation based on said position information before said at least one aberration is corrected and said corrected position information, and said at least one aberration is corrected throughout said image based on said position information in accordance with said aberration equation.

Preferably, the position information of said subject before said at least one aberration is corrected and the corrected position information thereof, both being extracted from said input image data, are the position information for an edge of said subject.

The invention further provides an image processing apparatus that applies specified image processing to input image data obtained from an image recorded optically with a taking lens so as to produce output image data that can be reproduced as a visible image, comprising:

an acquiring means for acquiring information that identifies said taking lens;

a storage means for storing lens characteristics associated with type of said taking lens; and a correcting means which, in response to the identifying information acquired by said acquiring means, receives the corresponding lens characteristics of said taking lens from said storage means and which corrects at least one aberration of said optically recorded image selected from among lateral chromatic aberration, distortion, decrease in the brightness of the edge of image field and image blurring based on said lens characteristics and position information of said image.

Preferably, said correcting means has correction equations associated with a plurality of types of the taking lens and said storage means stores correction coefficients for said correction equations as said lens characteristics in accordance with the type of said taking lens.

Preferably, said correcting means is such that based on offsets on the image, from a reference color for three primaries, of the other colors due to said lateral chromatic aberration, image positions as corrected for the lateral chromatic aberration of the three primaries are calculated to correct the lateral chromatic aberration of the image, or such that based on an offset on the image due to said distortion, the image positions as corrected for the distortion of the three primaries are calculated to correct the distortion of the image, or such that based on the offsets on the image, from a reference color for three primaries, of the other colors due to said lateral chromatic aberration, as well as an offset of the image of said reference color due to said distortion, the image positions as corrected for the lateral chromatic aberration and distortion of the three primaries are calculated to correct the lateral chromatic aberration and distortion of the image.

Preferably, said correcting means, using the image positions as corrected for the lateral chromatic aberration of said three primaries, or the image positions as corrected for the distortion of said three primaries, or the image positions as corrected for the lateral chromatic aberration and distortion of said three primaries, performs electronic scaling, whereby arithmetic operations for interpolation to perform correction of lateral chromatic aberration and electronic scaling, or correction of distortion and electronic scaling or correction of both lateral chromatic aberration and distortion and electronic scaling are performed simultaneously.

Preferably, the identifying information to be acquired by said acquiring means is information about said taking lens that is recorded either optically or magnetically on a film for optically recording said image or on a film cartridge.

Preferably, the image processing apparatus is connected to an apparatus for outputting a print reproducing said output image data as said visible image.

Preferably, said correcting means, based on the identifying information acquired by said acquiring means, determines whether it is necessary to correct the distortion of said image and if the correction of distortion is found unnecessary, performs image processing under specified conditions and if the correction of distortion is found necessary, receives the lens characteristics of the associated taking lens from said storage means, corrects the distortion of the image based on the position information of said image and said lens characteristics and performs image processing under different conditions than when said correction of distortion is unnecessary.

Preferably, said image processing is the electronic scaling which, if said correction of distortion is not effected, is performed at a specified ratio associated with the output image but if said correction of distortion is effected, said electronic scaling is performed at a higher scaling ratio than when said correction of distortion is not effected.

Preferably, said scaling ratio higher than when said correction of distortion is not effected is sufficient to cancel image dropout resulting from said correction of distortion.

Preferably, the electronic scaling ratio is adjusted in accordance with the type of said taking lens when said correction of distortion is effected.

Preferably, the electronic scaling is performed at a specified ratio irrespective of the type of said taking lens when said correction of distortion is effected.

Preferably, said correcting means corrects the distortion by calculating appropriate positions of the respective three primaries based on the offsets of the image positions due to said distortion.

Preferably, said correcting means calculates the appropriate positions of the respective three primaries based on the offsets of the image positions due to the distortion and performs electronic scaling of the image using the information about said appropriate positions.

Preferably, said correcting means, prior to calculating the appropriate positions of said respective three primaries, calculates the offsets, from a reference color for three primaries, of the image positions of the other colors due to lateral chromatic aberration and, using the offsets due to said lateral chromatic aberration and the offset of the image position of said reference color due to distortion, calculates the appropriate positions of the respective three primaries as corrected for both distortion and lateral chromatic aberration.

Preferably, the ratio of said electronic scaling differs between vertical and horizontal directions of the image.

Preferably, the image processing apparatus further includes an image display device that displays said optically recorded image as a verification image based on the input image data as obtained from said recorded image, said visible image being a printed image, said output image data being image data for outputting said printed image from the printer, said correcting means being such that not only the image data for outputting said printed image from the printer but also the image data used for display on said image display device is corrected for at least one aberration of said optically recorded image selected from among lateral chromatic aberration, distortion, decrease in the brightness of the edge of image field and image blurring, and prior to outputting said output image data for producing said printed image as corrected by said correcting means, a corrected image for producing said printed image is displayed on said image display device based on display image data as corrected by said correcting means.

Preferably, said corrected display image data is based on either low-resolution, prescanned image data or image data obtained by removing portions of high-resolution, fine scanned image data or reducing its size.

Preferably, said corrected image based on the display image data as corrected by said correcting means and a print area for said printed image to be outputted are displayed simultaneously on said image display device.

The invention still further provides an image processing apparatus that obtains input image data from an image recorded optically with a taking lens and that applies specified image processing to the obtained input image data to produce output image data, comprising:

an image display device for displaying said image based on said input image data;

a detecting means that specifies a subject to be corrected for aberrations that is selected from the image displayed on said image display device and which detects at least one aberration characteristic selected from between the lateral chromatic aberration characteristic and the distortion characteristic due to said taking lens; and a correcting means which, based on both said aberration characteristic detected by said detecting means and the position information of said image, corrects at least one aberration selected from between the lateral chromatic aberration and the distortion of said recorded image.

Preferably, said detecting means obtains at least two points of the position information that specify a subject to be corrected for aberrations that is selected from the image displayed on said image display device, extracts said subject between said at least two points based on said input image data, acquires the position information of said subject before it is corrected for aberrations, also acquires the corrected position information of said subject as predictable between said at least two points and calculates an aberration equation based on said position information which is yet to be corrected for aberrations and said corrected position information.

Preferably, the position information of said subject to be corrected for aberrations is the position information for an edge of said subject.

The invention yet further provides an image processing apparatus that obtains input image data from an image recorded optically with a taking lens and that applies specified image processing to the obtained input image data to produce output image data, comprising:

an image display device for displaying said image based on said input image data;

an acquiring means for acquiring at least one aberration characteristic selected from between the lateral chromatic aberration characteristic and the distortion characteristic of said taking lens;

a correcting means for correcting at least one of the lateral chromatic aberration and the distortion of said recorded image based on both said at least one aberration characteristic acquired by said acquiring means and the position information of said image; and an adjusting means for adjusting correction intensity or aberration pattern of said at least one aberration characteristic used by said correcting means, wherein said image display device displays an image that is corrected for said at least one aberration by said correcting means, said adjusting means adjusts different levels of said correction intensity or aberration pattern, the best state of correction is determined from among a plurality of displayed images that have been corrected by said correcting means in accordance with said adjusted correction intensity or aberration pattern and the image data that has been corrected for aberrations to the best state is produced as said output image data.

Preferably, said image display device displays at least one image that has been corrected for aberrations by said correcting means, the image as corrected for aberrations by said correcting means is displayed on said image display device for each adjustment of said correction intensity or aberration pattern by said adjusting means, and said display is repeated for more than one level of said correction intensity and aberration pattern such as to determine said best state of correction.

Preferably, said image display device displays a plurality of images simultaneously as they have been corrected for aberrations by said correcting means for each adjustment of said correction intensity or aberration pattern by said adjusting means and the best state of aberrational correction is determined from among the displayed corrected images.

Preferably, said acquiring means selects one aberration characteristic from among a plurality of preliminarily provided aberration characteristics that have specified aberration patterns and intensities of aberrational correction.

Preferably, said acquiring means is a detecting means that specifies said subject to be corrected for aberrations that is selected from the image displayed on said image display device and which detects at least one aberration characteristic selected from between the lateral chromatic aberration characteristic and the distortion characteristic due to said taking lens.

BRIEF DESCRIPTION OF THE DRAWINGS

FIGS. 4a, 4b, 4c and 4d show in conceptual form how distortion is corrected and electronic scaling is performed in an embodiment of the image processing method of the present invention;

DETAILED DESCRIPTION OF THE INVENTION

The image processing method and apparatus of the present invention are now described in detail with reference to the preferred embodiments shown in accompanying FIGS. 1–12.

Figure 1:
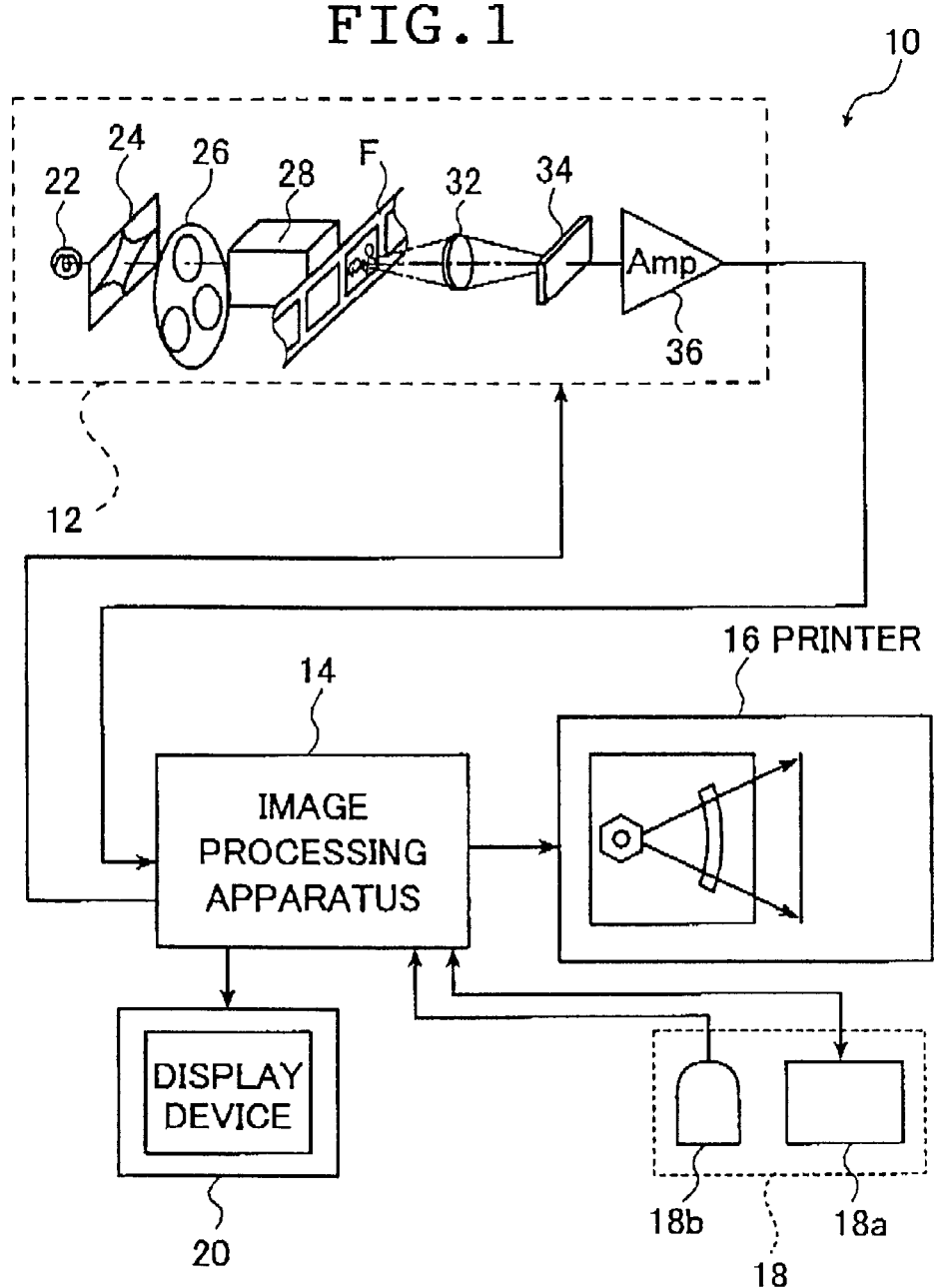
FIG. 1 is a block diagram showing an example of a digital photoprinter using the image processing apparatus of the present invention for implementing the image processing method of the present invention.

FIG. 1 is a block diagram showing an example of a digital photoprinter using the image processing apparatus of the present invention for implementing the image processing method of the present invention.

The digital photoprinter (hereinafter referred to as "photoprinter") which is generally indicated by 10 in FIG. 1 comprises basically a scanner (image reading apparatus) 12 for photoelectric reading of the image recorded on a film F, an image processing apparatus 14 which performs image processing on the thus read image data (image information) and with which the photoprinter 10 as a whole is manipulated and controlled, and a printer 16 which performs imagewise exposure of a light-sensitive material (photographic paper) with light beams modulated in accordance with the image data delivered from the image processing apparatus 14 and which performs development and other necessary processing to produce a (finished) print.

Connected to the image processing apparatus 14 are a manipulating unit 18 having a keyboard 18a and a mouse 18b for inputting (setting) various conditions, selecting and commanding a specific processing step and entering a command and so forth for effecting color/density correction, as well as a monitor (display or image display device) 20 for displaying the image read with the scanner 12, various manipulative commands and pictures for setting and registering various conditions. The monitor 20 may be used as a verification monitor for verifying the image recorded on the film F.

The scanner 12 is an apparatus with which the image recorded on the film F is read photoelectrically frame by frame. It comprises a light source 22, a variable diaphragm 24, a color filter assembly 26 that has three color filters R, G and B for separating the image into three primary colors R (red), G (green) and B (blue) and which rotates to have any one of these color filters act on the optical path, a diffuser box 28 which diffuses the reading light incident on the film F so that it becomes uniform across the plane of the film F, an imaging lens unit 32, a CCD sensor 34 which is an area sensor for reading the image in one frame of the film, and an amplifier (Amp) 36.

In the illustrated photoprinter 10, dedicated carriers are available that can be loaded into the housing of the scanner 12 in accordance with the type of the film used (e.g. whether it is of an Advanced Photo System or a negative or a reversal of 135 size), the format of the film (e.g. whether it is a strip or a slide) or the mode of the processing to be performed (e.g. whether it is trimming). By replacing one carrier with another, the photoprinter 10 can be adapted to process various kinds of films in various modes. The image (frame) that is recorded on the film and which is subjected to the necessary procedure for print production is transported to and held in a specified reading position by means of the carriers.

As is well known, a film of the Advanced Photo System has a magnetic recording medium formed thereon and information such as the ID No. of the film cartridge and the species of the film (or the model if it is a film with lens) is recorded. In addition, after taking a picture, development and so forth, various kinds of data such as the date of shooting, the camera used in shooting and the type of the developing machine used can be recorded on the film. A carrier corresponding to the film (or its cartridge) of the Advanced Photo System is fitted with a means of reading said magnetic information from the magnetic recording medium. Said means reads the magnetic information as the film is being transported to the reading position, so that the various kinds of information mentioned above are sent to the image processing apparatus 14.

In the scanner 12, the reading light from the light source 22 has its quantity adjusted by means of the variable diaphragm 24, adjusted in color by passage through the color filter assembly 26 and diffused in the diffuser box 28. The diffused reading light is incident on one frame of the film F held in the specified reading position by means of the carrier and thereafter passes through the frame to produce projected light carrying the recorded image in the particular frame of the film F.

The projected light from the film F is processed by the imaging lens unit 32 to be focused on the light-receiving plane of the CCD sensor 34, which reads the focused light photoelectrically; the resulting output signal is amplified with the Amp 36 and sent to the image processing apparatus 14. The CCD sensor 34 is typically an area CCD sensor consisting of 1380×920 pixels.

The scanner 12 performs this image reading step three times by successively inserting the color filters R, G and B of the color filter assembly 26, whereupon the image of one frame is read as three separate primary colors R, G and B.

The illustrated photoprinter 10 is such that prior to image reading (fine scanning) for outputting a print P, prescanning which reads the image at low resolution is performed in order to determine the image processing conditions and so forth. This means that a total of six image reading steps are performed for one frame. If desired, the prescanned image data may be replaced by fine scanned image data in determining the image processing conditions and so forth; in this alternative case, a total of three image reading steps suffice to be performed for one frame.

For image reading, the scanner 12 uses an area CCD sensor and separates the projected light into three primary colors by means of the color filter assembly 26. This is not the sole case of the scanner that can be used in the present invention; in place of the area CCD sensor, three line CCD sensors associated with the reading of the light of three primary colors, say, R, G and B, may be used such that the image is read by slit scan of the film P being transported with a carrier.

In the illustrated photoprinter 10, the scanner 12 which performs photoelectric reading of the image recorded on a film such as a negative or a reversal is used as a source of supplying image data into the image processing apparatus 14. It should, however, be noted that the scanner 12 is not the only applicable source of supplying image data into the image processing apparatus 14 and various image reading means, imaging means and means of storing image data can be substituted, as exemplified by an image reading apparatus for reading the image on a reflection original, an imaging device such as a digital camera or a digital video camera, communication means such as a LAN (local area network) or an on-line service network, and a recording medium such as a memory card or MO (magneto-optical recording medium). Thus, the present invention is also applicable with advantage to the image (image data) recorded optically with an imaging device such as a digital camera.

As already mentioned, the output signal (image data) from the scanner 12 is delivered to the image processing apparatus 14.

Figure 2:
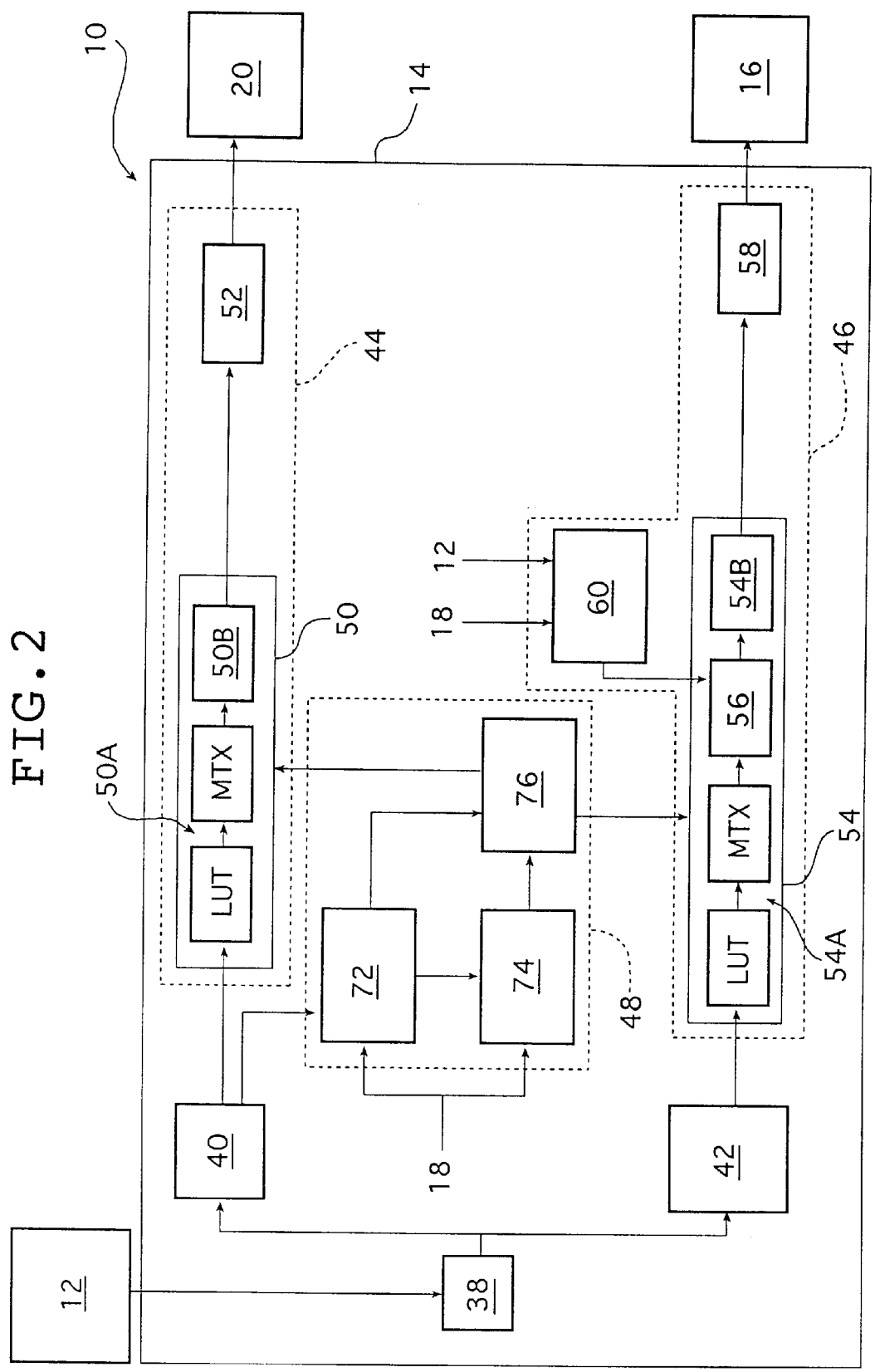
FIG. 2 is a block diagram showing an example of the image processing apparatus of the present invention which is used in the digital photoprinter shown in FIG. 1.

FIG. 2 is a block diagram showing an example of the image processing apparatus according to the third aspect of the present invention which implements the image processing method according to its first aspect.

The image processing apparatus (hereinafter referred to as the "processor") which is generally indicated by 14 in FIG. 2 comprises a data processing section 38, a prescan (frame) memory 40, a fine scan (frame) memory 42, a prescanned (or display) image processing section 44, a fine scanned image processing section 46, and a conditions setting section 48.

FIG. 2 shows only the parts related to image processing and the processor 14 actually includes other necessary parts such as a CPU with which the photoprinter 10 as a whole including the processor 14 is controlled and managed, a memory for storing the information necessary for operation and otherwise of the photoprinter 10, and a means of determining the value to which the variable diaphragm 24 is stopped down in a fine scan mode and the storage time of the CCD sensor 34. The manipulating unit 18 and the monitor 20 are connected to related parts via the CPU and other necessary parts (forming a CPU bus).

Each of the output signals R, G and B from the scanner 12 is fed into the data processing section 38, where it is subjected to A/D (analog/digital) conversion, logarithmic conversion, DC offset correction, dark correction, shading correction and other processing steps so that each output signal is converted to digital image data, of which prescanned (image) data is stored in the prescan memory 40 and fine scanned (image) data is stored in the fine scan memory 42.

It should be noted that the prescanned data and the fine scanned data are basically the same except for resolution (pixel density) and signal level.

The prescanned data stored in the prescan memory 40 is subsequently processed in the prescanned image processing section 44 and the fine scanned data stored in the fine scan memory 40 is subsequently processed in the fine scanned image processing section 46.

The prescanned image processing section 44 comprises an image processing subsection 50 and an image data converting subsection 52; the image processing subsection 50 comprises two blocks, an image processing block (hereinafter referred to simply as "block") 50A having LUT and MTX and an image processing block 50B. The fine scanned image processing section 46 comprises an image processing subsection 54, an image data converting subsection 58 and a lens characteristics data supply subsection 60; the image processing subsection 54 comprises three components, a block 54A having LUT and MTX, an aberration correcting part 56 which is characteristic of the present invention, and a block 54B.

The image processing subsection 50 of the prescanned image processing section 44 (which is hereinafter referred to as "processing subsection 50") and the image processing subsection 54 of the fine scanned image processing section 46 (which is hereinafter referred to as "processing subsection 54") are the sites where the image (image data) read with the scanner 12 is subjected to specified image processing steps in accordance with the image processing conditions set by means of the conditions setting section 48 to be described later in this specification. The two subsections perform basically the same processing, except that the image data to be processed have different pixel densities and that the processing subsection 50 of the prescanned image processing section 44 does not have an aberration correcting part.

The image processing steps to be performed in the image processing block 50A of the processing subsection 50 and the image processing block 54A of the processing subsection 54 may be exemplified by, for example, color balance adjustment, contrast correction (gradation adjustment), brightness correction, dodging (compression/expansion of the density's dynamic range), saturation correction and sharpening. These steps may be performed by any known methods comprising suitable combinations of arithmetic operations, processing with a LUT (lookup table), matrix (MTX) operations, filtering and so forth; in the illustrated case, color balance adjustment, brightness correction and contrast correction are performed with LUTs and saturation correction with MTX. Sharpening, dodging and other steps are performed in the image processing blocks 50A and 54B in response to an operator's command, or in accordance with the image data to be processed and so forth.

In the illustrated case, the aberration correcting part 56 (for correcting lateral chromatic aberration and distortion and for performing electronic scaling) is provided between the MTX in the block 54A and the block 54B in the fine scanned data processing subsection 54. The lens characteristics data supply subsection 60 is connected to the aberration correcting part 56.

In the illustrated processor 14, the image recorded on the film F is corrected, as need arises, for lateral chromatic aberration and distortion in the aberration correcting part 56 by image processing using the lens characteristics and the position information of the image to be processed, for example. The position of each pixel in the image data (how far it is from the center of the image), may be connected to enable consistent outputting of prints that reproduce a high-quality image free from color mismatch and distortion.

Needless to say, an aberration correcting part may also be provided in the processing subsection 50 of the prescanned image processing section 44, so that the image to be displayed on the monitor 20 is corrected for lateral chromatic aberration, distortion and other lens aberrations (see below).

The lens characteristics data supply subsection 60 (hereinafter referred to as the "characteristics data supply subsection") is a site where information that identifies the camera used to take the image on the film F is acquired and the lens characteristics associated with the camera corresponding to the thus acquired identifying information are supplied to the aberration correcting part 56.

The information for identifying the camera (i.e. taking lens) is not limited to any particular type.

Similarly, the means of acquiring such identifying information is not limited to any particular method and various methods may be employed. For example, if the film F is a film with lens of the aforementioned Advanced Photo System, the magnetic information recorded on the film F may be read with the carrier in the scanner 12 so that the magnetically recorded cartridge ID No., film species or the like is used to identify the model of the camera, or the film with lens. A certain model of camera that is adaptable to the Advanced Photo System is capable of magnetic recording of camera model on the film F and this capability may be used to identify the camera that took the picture on the film F.

Alternatively, a laboratory attendant receiving a print from the customer may ask the model of the film with lens or the camera, or judge it by himself and record the camera model on an order bag, a slip of paper, a package, a film cassette, a cartridge or some other suitable it becomes necessary to prepare prints, the operator looks at the indication and manipulates the keyboard 18a to enter the camera model. According to another method, the operator may use a predetermined correspondence between function keys and camera to enter the camera model.

Still another method that can be used is optically exposing the camera model on the film when shooting is done and subsequently reading the thus recorded information to identify the camera model. Alternatively, the model of a film with lens may be optically exposed (as in the case of DX code if it is simply a film with lens) or magnetically recorded (if it is a film of the Advanced Photo System), typically during manufacture, and the thus recorded information is used to identify the film model. For example, the model of a film with lens may be optically exposed using "SSU INDICATOR" which is an expanded DX code for films of the Advanced Photo System.

The characteristics data supply subsection 60 has a memory that stores information about the lens characteristics associated with various camera models, specifically information about the characteristics of lateral chromatic aberrations and distortions of various lenses. In a preferred embodiment of the first and third aspects of the present invention, the memory also stores information about the electronic scaling ratio corresponding to a lens for which information about the characteristics of aberrations is already stored.

Based on the acquired camera identifying information, the characteristics data supply subsection 60 reads the information about the associated lens characteristics out of a the memory and supplies i t into the aberration correcting part 56. It should be noted that the lens characteristics are not limited to what are to be stored in the memory in the characteristics data supply subsection 60 alternatively they may be stored in a database connected to the photoprinter 10 so that it can be accessed for retrieval. Alternatively, the lens characteristics may be supplied externally during scanning of the film F as lens information corresponding to the film.

The information about the lens characteristics, namely, the characteristics of lateral chromatic aberration and distortion of a lens, is not limited in any particular way and it may be correction functions or coefficients for correcting lateral chromatic aberration and distortion. Alternatively, basic correction functions (basic correction equations) for correcting lateral chromatic aberration and distortion that are commonly applicable to a plurality of lens species, preferably the main lens species to be processed in the photoprinter 10 may be stored such that the correction coefficients in the basic correction equations are stored for each of the lens species to be processed. If desired, the correction equations per se may be stored as lens characteristics for each of the lens species to be processed.

The lateral chromatic aberration and distortion of a lens can generally be approximated to a reasonable extent by cubic functions using as a parameter the distance from the optical axis of the lens, namely, the center of the image recorded on the film F (which is typically expressed as x-y). Therefore, a function representing the lateral chromatic aberration of each camera species that need be corrected for lateral chromatic aberration, as well as a function representing the distortion of that camera may be stored as information about aberrational lens characteristics.

In a preferred embodiment of the first and third aspects of the present invention, information about the electronic scaling ratio of each lens that corresponds to the correction of distortion may be such that a correction coefficient by which an ordinary electronic scaling ratio is multiplied or which is to be added to the latter is calculated for each lens and stored as a lens characteristic. Details of the adjustment of electronic scaling ratio corresponding to the correction of distortion will be given later in this specification.

Using the taking lens characteristics of the film F fed from the characteristics data supply subsection 60 and the position information for the image data (pixel) which typically indicates the position of pixel coordinates (how many pixels are there as counted from the image center, or the center of the optical axis of the taking lens), the aberration correcting part 56 not only corrects the lateral chromatic aberration and distortion of the lens but also performs electronic scaling. If the center of an image sliced by a mask or some other means is considered to be in substantial coincidence with the center of the optical axis of the taking lens, various aberrations (e.g. distortion, lateral chromatic aberration, decrease in the brightness of the edge of image field and defocused image) may be corrected assuming that the pixel in the center of the sliced image is at the center of the optical axis of the lens.

The coordinates of a pixel may be x-y coordinates or polar coordinates. The position information for the image data is not limited to that which is referenced to the center of the image and various other references may be substituted, such as a corner of the image (e.g. the upper left corner), a particular pixel (e.g. the pixel assigned with pix No. 1), as well as an area exterior to the image, for example, perforations in the film F. In other words, various kinds of position information may be used in the present invention as long as the relative position of the image (pixel) can be detected.

It should be noted that if lateral chromatic aberration and distortion are corrected separately using the lens characteristics and the position information for the image (which is hereinafter referred to as "pixel position"), much time is required to perform mathematical operations and, in addition, mathematical operations for interpolation must be performed several times, which may lead to image deterioration.

The present invention preferably deals with this problem by correcting the distortion after correcting the lateral chromatic aberration using one of the three primaries R, G and B, typically G, as a reference color. In this case, the magnifications of R and B are converted such that the R and B images match the G image, whereupon the lateral chromatic aberration is corrected. On the basis of the corrected aberrations, the appropriate position of each pixel is calculated and mathematical operations are accordingly performed to interpolate the image data for the respective pixels, thereby producing image data that has been corrected for the lateral chromatic aberration and distortion of the image recorded on the film F.

For correcting the distortion in this method, one only need perform arithmetic operations on the G image. Therefore, both lateral chromatic aberration and distortion can be corrected very efficiently with reduced numbers of arithmetic operations and those for interpolation.

An image processing apparatus usually performs electronic image scaling (i.e., enlarges or contracts the image) by processing image data so that the image (image data) is adjusted to the size of an output image before it is delivered from the apparatus. The electronic scaling of the image is usually performed by arithmetic operations of the image data for interpolation.

A problem with this approach is that two interpolations are performed (arithmetic operations for interpolation have already been performed to correct the lateral chromatic aberration and distortion), which frequently results in image deterioration.

In a particularly preferred embodiment, the present invention deals with this problem by the following approach: using the aforementioned lens characteristics and pixel position for the image data, the appropriate positions of individual pixels are calculated from an offset in the pixel positions of R and B from the reference color (G) that has been caused by lateral chromatic aberration and an offset in the pixel position of the reference color due to distortion, and using the information about the thus calculated appropriate positions of the pixels, the image data is interpolated to perform electronic scaling of the image. In other words, the positions in which the individual pixels should inherently be located are predicted by calculating the offsets in pixel position due to lateral chromatic aberration and distortion and in accordance of the thus predicted appropriate positions, arithmetic operations for interpolation are performed on the image data, thereby accomplishing the intended electronic scaling.

This way, the correction of lateral chromatic aberration and distortion and the electronic scaling can be accomplished by performing a single sequence of arithmetic operations for interpolation.

The illustrated aberration correcting part 56 is a site where both the correction of lateral chromatic aberration and distortion and the electronic scaling are performed by the above-described method. As shown in conceptual form in FIG. 3, the aberration correcting part 56 comprises a coordinates transforming section 56A and an enlarging 1 contracting section 56B.

Figure 3:
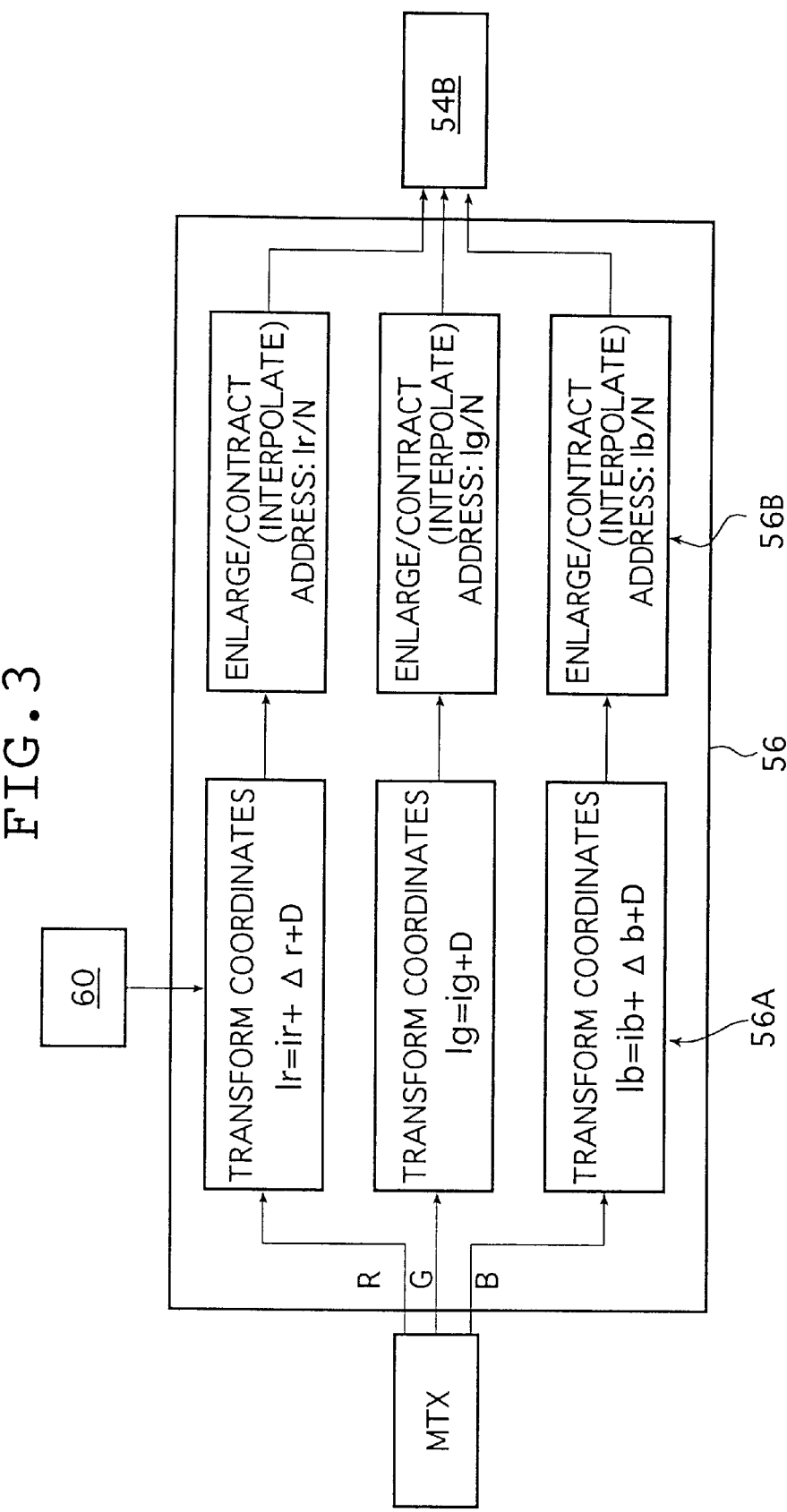
FIG. 3 shows in conceptual form an example of the aberration correcting part of the image processing apparatus shown in FIG. 2.

In FIG. 3, ir, ig and ib each represent the pixel position (address) of image data (input image data) supplied from MTX in the block 54A; Ir, Ig and Ib each represent the pixel position for the image data that has been corrected for lateral chromatic aberration and distortion; Δr and Δb represent offsets (the amounts of correction) in the pixel positions of R and B, respectively, from the pixel position of G that have been caused by lateral chromatic aberration; and D represents an offset in the pixel position of G due to distortion.

When the aberration correcting part 56 is supplied with the image data from MTX in the block 54A, the coordinates transforming section 56A, using the lens characteristics from the characteristics data supply subsection 60, calculates the offsets Δr and Δb due to lateral chromatic aberration from ig, the pixel position of image data G, at ir and ib, respectively, which represent the pixel positions of the image data R and B, as well as the offset D of ig (the pixel position of the input image data G) due to distortion.

The subsequent operations are also clear from FIG. 3; Δr and D are added to ir, or the position of each pixel in the input image data R, so as to calculate Ir, or the pixel position for the image data R that has been corrected for lateral chromatic aberration and distortion; Δb and D are added to ib, or the position of each pixel in the input image data B, so as to calculate Ib, or the pixel position for the image data B that has been corrected for lateral chromatic aberration and distortion; then, D is added to ig, or the position of each pixel in the input image data G, so as to calculate Ig, or the pixel position for the image data G that has been corrected for lateral chromatic aberration and distortion.

Thus, in these calculations, the lateral chromatic aberrations of the R and B images are corrected with reference to the G image so that the overall image is brought into registry with the G image; on the other hand, the offset D in the G image due to distortion is used to correct the overall distortion, thereby calculating the pixel positions that have been corrected for the lateral chromatic aberrations and distortions of the respective images R, G and B.

The process then goes into the enlarging/contracting section 56B, where image scaling is performed by interpolation (N-fold interpolation) of the image data in accordance with a desired ratio of enlargement or contraction using the pixel positions Ir, Ig and Ib that have been corrected for lateral chromatic aberration and distortion. Thus, image data that has been corrected for lateral chromatic aberration and distortion and which has been scaled electronically is outputted to the block 54B.

The method of electronic scaling is not limited to any particular type and various known methods may be employed, as exemplified by the use of bilinear interpolation and spline interpolation.

It should be noted here that if the characteristics data supply subsection 60 does not acquire the camera identifying information or if there are no lens characteristics that correspond to the camera identifying information acquired by the characteristics data supply subsection 60 or if a command is issued for cancelling the correction of lateral chromatic aberration and distortion, the aberration correcting part 56 performs only electronic scaling in the enlarging/contracting section 56B and the resulting image data is supplied into the block 54B.

The illustrated apparatus assumes a preferred embodiment in which both distortion and lateral chromatic aberration are corrected in the aberration correcting part 56. This is not the sole case of the present invention, and the characteristic of either lateral chromatic aberration or distortion may be stored as a lens characteristic and used in combination with pixel positions to correct only the associated aberration.

In this alternative case, the appropriate position that has been corrected for the offset due to lateral chromatic aberration or distortion may be calculated and subsequently used to correct the corresponding aberration, followed by electronic scaling in accordance with a known method. Preferably, the above-mentioned procedure is adopted; the appropriate position that has been corrected for the offset due to lateral chromatic aberration or distortion is calculated and the information on the thus calculated appropriate position is used in interpolating the image data to perform electronic scaling, thereby accomplishing both aberrational correction and electronic scaling. This procedure is similarly effective in reducing the number of arithmetic operations for interpolation to attenuate the image deterioration due to interpolation.

According to the present invention, not only the lens characteristics for correcting lateral chromatic aberration and/or distortion but also those for correcting other lens-induced aberrations such as defocusing (PSF or point spread function) and decrease in the brightness of the edge of image field may be stored. Thus, in place of lateral chromatic aberration and/or distortion, PSF and/or decrease in the brightness of the edge of image field may be corrected.

In a preferred embodiment of the first and third aspects of the present invention, electronic scaling is preferably performed at a higher-than-usual scaling ratio if correction of distortion is performed. However, if the latter is not performed, electronic scaling is preferably performed at the usual scaling ratio associated with the size of the image to be outputted.

Stated more specifically, if the characteristics data supply subsection 60 does not acquire the camera identifying information or if there are no lens characteristics that correspond to the camera identifying information acquired by the characteristics data supply subsection 60 or if a command is issued for cancelling the correction of lateral chromatic aberration and distortion, the aberration correcting part 56 of the illustrated image processing apparatus 14 concludes that there is no need to correct the distortion and simply lets the image data pass through the coordinates transforming section 56A (or an optional bypass) without performing any processing and only electronic scaling is performed in the enlarging/contracting section 56B, with the resulting image data being thereafter outputted to the block 54B.

In this case, the enlarging/contracting section 56B performs electronic scaling at the usual scaling ratio that is set in accordance with the size of the image (print) to be outputted.

In other cases, the aberration correcting part 56 concludes that the distortion need be corrected and performs the aforementioned process of aberrational correction. As already mentioned, the lens characteristics required in this process include, besides the information about the characteristics of distortion and lateral chromatic aberration, a correction coefficient for electronic scaling ratio associated with the lens species, which is sent to the enlarging/contracting section 56B and the usual scaling ratio associated with the image size is corrected by the coefficient so as to perform electronic scaling at a higher-than-usual scaling ratio (the image is made larger than usual).

FIG. 4 shows graphically the image (particularly its shape and size) which is created by the processing in the aberration correcting part 56.

The image data for the image recorded on the film F that is being outputted from the scanner 12 assumes a rectangular shape as shown in FIG. 4*a* that is determined either by the size of the mask used in image reading or by the splicing of an image corresponding to the output image.

On the other hand, the image data that has been corrected for distortion in the coordinates transforming section 56A (namely, the positions of individual pixels have been rendered appropriate) deforms according to the degree of distortion as shown in FIG. 4*b*, in which the hatched areas have no image data due to vignetting. If the image is subjected to electronic scaling at the usual ratio (e.g. enlarged by $k_1$ or contracted by $k_2$), the output image (print) P becomes clear in the hatched areas as shown in FIG. 4*d*.

If the apparatus is of a type that normally has high settings of electronic scaling ratio, the above-described problem is absent since the image data has a sufficiently large size to be insensitive to the distortion. On the other hand, the image recorded on a film is preferably reproduced on a print as completely as possible and with a photoprinter that intends to produce prints of higher quality, the electronic scaling ratio is set at the lowest possible level that is permitted by the size of the image to be read with the scanner and the size of the output image. Under the circumstances, if distortion is corrected in the manner just described above, vignetting may occur around the image depending on the degree of the aberration.

This is not the case of the present invention. If distortion is corrected, the ratio of electronic scaling is increased by an amount corresponding to the vignetting so that the vignetting due to aberrational correction is cancelled (e.g. enlarged by $n_1$ or contracted by $n_2$, provided that $k_1 > n_1$ and $k_2 < n_2$); thus, as shown in FIG. 4*c*, electronic scaling is performed in such a manner that the image region inward of the areas that have experienced vignetting due to the correction of distortion, preferably the image region inscribed within those areas, defines the size of the output image.

In the illustrated case, a coefficient correction for scaling ratio is preliminarily stored as a lens characteristic for each of the lenses to be corrected for distortion and if the distortion is corrected, the usual scaling ratio is multiplied by the correction coefficient or the latter is added to the former, whereby electronic scaling is performed at a higher-than-usual ratio.

As a result, even with an apparatus that normally has the scaling ratio set at such values that the image recorded on a film can be reproduced on a print as completely as possible, any distortion in the image data can be effectively corrected and yet a vignette-free, high-quality image can be outputted, thereby satisfying both requirements for the correction of distortion and a satisfactory reproduction of the image recorded by the customer.

The method of determining the correction coefficient is not limited to any particular type, and various techniques may be employed such as an empirical approach, simulation based on lens design, and calculation from the resolution (size) of the image data, lens characteristics and electronic scaling ratio.

The amount of distortion sometimes differs between vertical and horizontal directions of the image and in that case the electronic scaling ratio (correction coefficient) is preferably varied accordingly.

It should also be noted that in the present invention, the correction coefficient for electronic scaling ratio need not be calculated for each of the lenses to be corrected and only one correction coefficient common to all lenses that are to be corrected for distortion may be stored. In this alternative case, the correction coefficient need be increased by about 0.1–5% of the usual value.

Instead of the correction coefficient, the scaling ratio used in the case of correcting distortion may be stored after it is calculated for each print size (and for each of the lenses to be corrected or in common to all lenses). In this case, too, the scaling ratio is preferably varied if the degree of distortion differs between vertical and horizontal directions of the image.

The image data that has thusly been corrected for at least one aberration in the aberration correcting part 56 (as selected from among lateral chromatic aberration, distortion, defocusing, decrease in the brightness of the edge of image field, and so forth), preferably the image data that has been electronically scaled at a higher-than-usual ratio when distortion is corrected, is sent to the block 54B, where it is optionally subjected to predetermined image processing steps such as dodging. This completes the procedure of image processing in the image processing subsection 54.

The image data processed in the processing subsections 50 and 54 is sent to the image data converting subsections 52 and 58.

The image data converting subsection 52 of the prescanned image processing section 44 is a site where the image data processed with the processing subsection 50 is converted with a 3D (three-dimensional) LUT or the like into image data corresponding to the display on the monitor 20. The image data converting subsection 58 of the fine scanned image processing section 46 is a site where the image data processed by the processing subsection 54 is similarly converted with a 3D LUT into image data that is subsequently supplied into the printer 16 as image data corresponding to image recording with the printer 16.

It should be noted that the image data subjected to image processing in accordance with the present invention may be outputted not only to the printer 16, but also to a recording medium such as a floppy disk or MO, a computer, a communication network and so forth.

As already mentioned, an aberration correcting part may also be provided in the prescanned image processing section 44 so that an aberration corrected image is displayed on the monitor 20 (see the description that follows hereinafter). Alternatively, portions of the image data that has been corrected for aberration in the fine scanned image processing section 46 may optionally be removed before it is displayed on the monitor 20 or some other display means.

The conditions for various processing steps that are to be performed in the prescanned image processing section 44 and in the fine scanned image processing section 46 are set by the conditions setting section 48. As shown, the conditions setting section 48 comprises the image processing conditions setting subsection 72, the key correcting subsection 74 and the parameter coordinating subsection 76.

The image processing conditions setting subsection 72 (hereinafter referred to as "setting subsection 72") selects a particular image processing step to be performed; it uses the prescanned data to set the conditions for image processing to be done in the processing subsections 50 and 54 and supply them to the parameter coordinating subsection 76.

Specifically, the setting subsection 72 uses the prescanned data to perform various operations, including the construction of density histograms and calculation of various image characteristic quantities such as average density, LATD (large-area transmission density), highlight (minimum density) and shadow (maximum density). In addition, in response to commands optionally entered by the operator using the manipulative unit 18, the setting subsection 72 determines the image processing conditions as by constructing tables (LUT) for the aforementioned gray balance adjustment, brightness correction and contrast correction, as well as the construction of operational matrices for saturation correction.

When correcting the distortion in the preferred embodiment under consideration, the ratio of electronic scaling differs from the usual value and various image processing conditions including the coefficients for sharpening, the coefficients to be applied to various filters and various correction coefficients may accordingly be altered.

The key correcting subsection 74 calculates the amounts of adjustment of image processing conditions (e.g. the amount of correction of LUT) typically in accordance with various commands entered by manipulation of keys for adjusting the brightness, color, contrast, sharpness, saturation and so forth that have been set in the keyboard 18a or by the mouse 18b; the key correcting subsection 74 then supplies the calculated amounts of adjustment into the parameter coordinating subsection 76.

After receiving the image processing conditions set by the setting subsection 72, the parameter coordinating subsection 76 sets the supplied image processing conditions in the processing subsection 50 of the prescanned image processing section 44 and the processing subsection 54 of the fine scanned image processing section 46. Further, in accordance with the amounts of adjustment calculated by the key correcting subsection 74, the parameter coordinating subsection 76 either corrects (adjusts) the image processing conditions set in various parts or makes another setting of image processing conditions.

The image processing apparatus according to the third aspect of the present invention has the basic construction described above. We now describe the operation of this apparatus, as well as the image processing method according to the first aspect of the present invention.

In the processor 14 shown in FIG. 2, when the prescanned data is stored in the prescan memory 40 as described above, the setting subsection 72 reads the stored data and performs the necessary operations including the construction of density histograms, calculation of image characteristic quantities; the setting subsection 72 uses such density histograms, image characteristic quantities and other parameters to set the image processing conditions (i.e. construct LUT and MTX in the block 54A) and send them to the parameter coordinating subsection 76.

In parallel with this procedure, the conditions for fine scan reading are set as by determining the value to which the variable diaphragm 24 is stopped down; this provides for adjustment of the scanner 12. Subsequently, the scanner 12 performs fine scan and the fine scanned data are sequentially transferred to and stored in the fine scan memory 40.

The processor 14 is also supplied with various kinds of commands and information that have been entered by manipulation of the keyboard 18a and the mouse 18b and the magnetic information that has been read from the film F with the scanner 12 (particularly the carrier); if the camera identifying information is entered in the manner already described above, it is also sent to the characteristics data supply subsection 60.

Upon receiving the image processing conditions, the parameter coordinating subsection 76 sets them in a specified site (hardware) in the processing subsection 50 of the prescanned image processing section 44 and in the processing subsection 54 of the fine scanned image processing section 46.

Subsequently, the prescanned data is read from the prescan memory 40, processed under the image processing conditions set in the processing subsection 50 and converted in the image data converting subsection 52; the prescanned image thus subjected to the specified processing is then displayed on the monitor 20. If necessary, the image to be displayed on the monitor 20 may be corrected for any lateral chromatic aberration and distortion in the same manner as already described above.

Looking at the display on the monitor 20, the operator checks (verifies) the image, or the result of the processing, and if necessary, manipulates the aforementioned keys on the keyboard 18a or the mouse 18b to adjust the color/density, gradation and other features of the image.

The inputs for this adjustment are sent to the key correcting subsection 74 which, in response to the entered inputs for adjustment, calculates the amounts of correction of the image processing conditions and sends them to the parameter coordinating subsection 76. In response to the supplied amounts of correction, the parameter coordinating subsection 76 corrects the LUTs and MTXs in the blocks 50A and 54A in the processing subsections 50 and 54, respectively, as already described above. The image displayed on the monitor 20 also varies in response to this corrective measure, or the inputs for adjustment entered by the operator.

If the operator concludes that the image displayed on the monitor 20 is appropriate (verification OK), he manipulates the keyboard 18a or the mouse 18b to give a command for print start, whereupon the image processing conditions are finalized and the fine scanned data is read from the fine scan memory 42 and sent to the processing subsection 54 of the fine scanned image processing section 46.

In the processing subsection 54, the image data is processed by the LUT and MTX in the block 54A and thereafter sent to the aberration correcting part 56. In a separate step, the characteristics data supply subsection 60 uses the acquired camera identifying information to read the corresponding lens characteristics and sends them to the aberration correcting part 56.

In the coordinates transforming section 56A of the aberration correcting part 56, Ir, Ig and Ib which represent the pixel positions that have been corrected for lateral chromatic aberration and distortion are calculated in the manner described above on the basis of the lens characteristics and the pixel positions for the image data. The calculated pixel positions Ir, Ig and Ib are sent to the enlarging/contracting section 56B. Using the supplied pixel positions Ir, Ig and Ib, the enlarging/contracting section 56B electronically scales the image by performing N-fold interpolation of the image data in accordance with the ratio of enlargement or contraction and the resulting image data that has been corrected for lateral chromatic aberration and distortion and which has been subjected to electronic scaling is then sent to the block 54B.

In the preferred embodiment under consideration, the enlarging/contracting section 56B first uses the supplied lens characteristic, or the correction coefficient for scaling ratio, to correct the usual scaling ratio which is in accordance with the size of the output image; the enlarging/contracting section 56B then uses the pixel positions Ir, Ig and Ib to scale the image electronically by performing N-fold interpolation of the image data in accordance with the corrected ratio of enlargement or contraction. The resulting image is thereafter outputted to the block 54B.

It should be noted that the calculation of the pixel positions Ir, Ig and Ib in the coordinates transforming section 56A and the calculation of the electronic scaling ratio in the preferred embodiment may be performed prior to the supply of the image data at the time when the information about the lens characteristics is received from the characteristics data supply subsection 60.

In the preferred embodiment of the first and third aspects of the present invention, if the aberration correcting part 56 concludes that there is no need to correct the distortion as already mentioned above, the coordinates transforming section 56A does not perform any processing but the enlarging/contracting section 56B performs electronic scaling at the usual scaling ratio which is in accordance with the size of the output image.

In the block 54B, the image data is subjected to sharpening, dodging and any other necessary image processing steps before it is sent to the image data converting subsection 58, where it is converted to image data suitable for image recording with the printer 16. The thus converted image data is then sent to the printer 16.

If no image verification is to be performed, the image processing conditions are finalized at the point of time when the parameter coordinating subsection 76 ends setting of the image processing conditions in the processing subsection 54 of the fine scanned image processing section 46, and the fine scanned data is automatically processed and sent to the printer 16.

The above-described alternative procedures are preferably selected in terms of operating modes or the like.

As already mentioned, the image data processed in the processor 14 is sent to the printer 16.

The printer 16 records a latent image by exposing a light-sensitive material (photographic paper) in accordance with the image data, performs development and any other necessary processing in accordance with the light-sensitive material and outputs it as a (finished) print. To give one example, the light-sensitive material is cut to a specified length in accordance with the size of the final print. Thereafter, the printer 16 records a back print and three light beams for exposure to red (R), green (G) and blue (B) in accordance with the spectral sensitivity characteristics of the light-sensitive material (photographic paper) are modulated in accordance with the image data (the image to be recorded.). The three modulated light beams are deflected in a main scanning direction and, at the same time, the light-sensitive material is transported in an auxiliary scanning direction perpendicular to the main scanning direction so as to record a latent image. The light-sensitive material having the latent image recorded thereon is subjected to a wet development process comprising color development, bleach-fixing and rinsing. The thus processed light-sensitive material is dried to produce a print; a plurality of prints thus produced are sorted in a stack tray.

In another preferred embodiment of the first and third aspects of the present invention, the correction of lateral chromatic aberration, distortion, decrease in the brightness of the edge of image field, defocusing and other lens aberrations is performed not only on the output image data which is to be eventually outputted as a print image but also on the display image data which is to be displayed on an image display device for verification.

Figure 5:
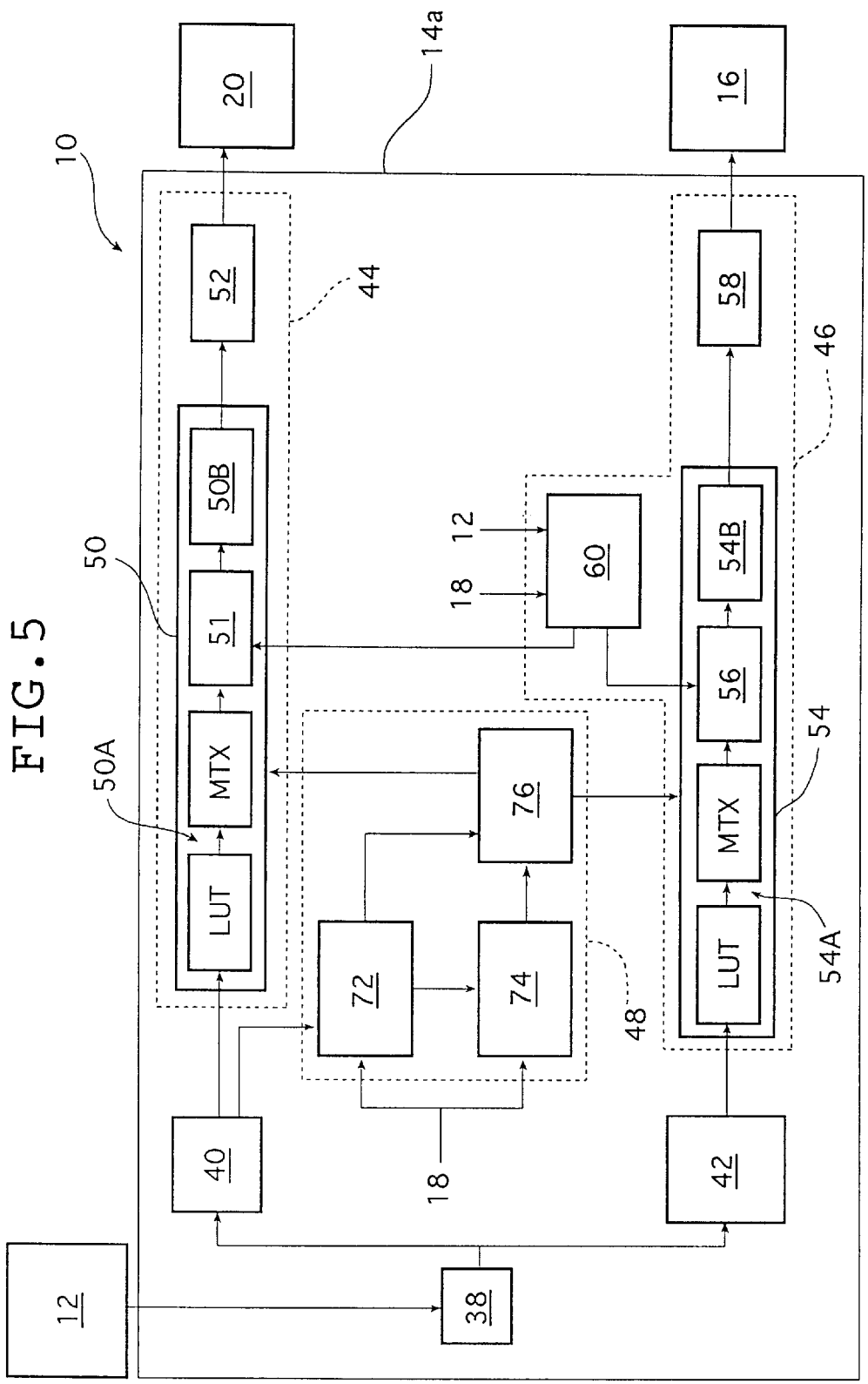
FIG. 5 is a block diagram showing a further example of the image processing apparatus of the present invention which is used in the digital photoprinter shown in FIG. 1.

FIG. 5 is a block diagram showing an example of the image processing apparatus in this embodiment.

The image processing apparatus generally indicated by 14a in FIG. 5 is applied to the digital photoprinter of FIG. 1 instead of the image processing apparatus 14 of FIG. 2. The two image processing apparatus are identical except that the apparatus 14a also has an aberration correcting part 51 in the processing subsection 50 of the prescanned image processing section 44 so that correction of lateral chromatic aberration, distortion or other lens aberrations can also be performed on the verification image to be displayed on the monitor 20. Therefore, like components are identified by like numerals and will not be described in detail.

In the processor 14a shown in FIG. 5, the image processing subsection 50 of the prescanned image processing section 44 comprises the block 50A having LUT and MTX, the aberration correcting part 51 which is characteristic of the present invention and the block 50B and it performs basically the same processing as the image processing subsection 54 of the fine scanned image processing section 46 except that the image data to be processed has a different pixel density (resolution).

The image processing apparatus 14a in the embodiment under consideration is characterized in that the processing subsection 50 for processing the prescanned image data and the processing subsection 54 for processing the fine scanned image data respectively have the aberration correcting parts 51 and 56 for performing the correction of lateral chromatic aberration and distortion and the electronic scaling in the manner to be described below. The aberration correcting part 51 is provided between MTX in the block 50A and the block 50B whereas the aberration correcting part 56 is provided between MTX in the block 54A and the block 54B. In the processor 14a of the illustrated embodiment, the image recorded on the film F may, depending on the need, be corrected for lateral chromatic aberration, distortion and other aberrations by image processing in the aberration correcting parts 51 and 56 using the lens characteristics and the position information of the image to be processed, thereby ensuring that a high-quality image free from color mismatch and distortion is displayed on the verification monitor 20 together with a print enables consistent outputting of prints that reproduce the high-quality image within the displayed print area.

The lens characteristics data supply subsection 60 acquires information that identifies the camera used to take the picture on the film F. It then reads from the lens memory the information about the lens characteristics associated with the taking camera that corresponds to the acquired camera identifying information and sends this information to both of the aberration correcting parts 51 and 56.

In the embodiment under consideration, the aberration correcting parts 51 and 56 perform the correction of lens aberrations such as lateral chromatic aberration, distortion, decrease in the brightness of the edge of image field and defocusing in entirely the same manner except for the pixel density of the image data to be processed.

The illustrated aberration correcting parts 51 and 56 are the sites where the correction of lateral chromatic aberration and distortion and the electronic scaling are performed by the method described above. As shown in conceptual form in FIG. 6, the aberration correcting part 51 comprises a coordinates transforming section 51A and an enlarging/contracting section 51B and, similarly, the aberration correcting part 56 comprises the coordinates transforming section 56A and the enlarging/contracting section 56B. It should be noted that the aberration correcting part 51 shown in FIG. 6 has entirely the same construction as the aberration correcting part 56 shown in FIG. 3.

As in the case of the aberration correcting part 56, when the aberration correcting part 51 is supplied with the image data from MTX in the block 50A, the coordinates transforming section 51A, using the lens characteristics from the characteristics data supply subsection 60, calculates the offsets $\Delta r$ and $\Delta b$ due to lateral chromatic aberration from ig, the pixel position of image data G, at ir and ib, respectively, which represent the pixel positions of the image data R and B, as well as the offset D of ig (the pixel position of the input image data G) due to distortion.

Figure 6:
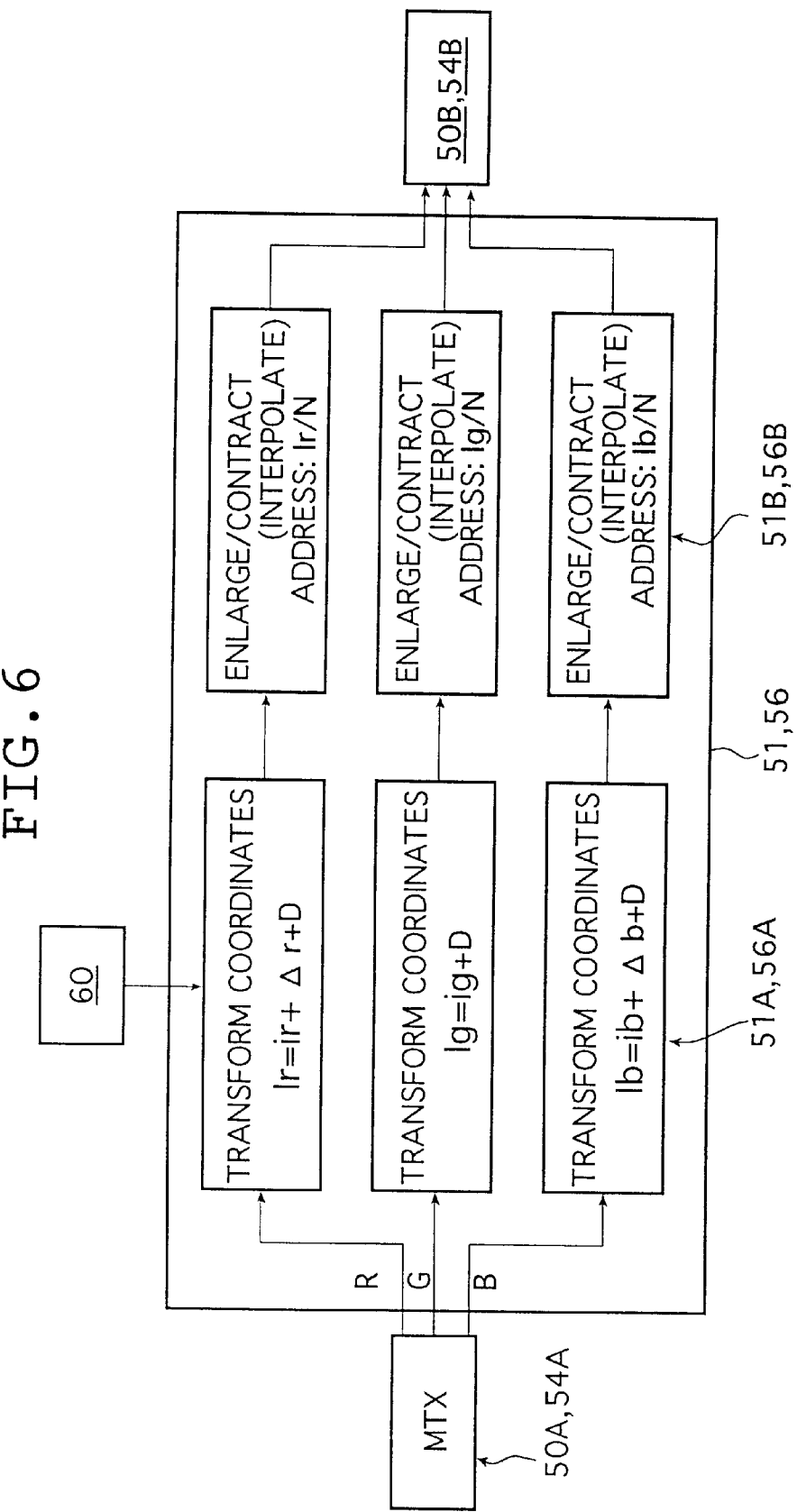
FIG. 6 shows in conceptual form an example of the aberration correcting part of the image processing apparatus shown in FIG. 5.

The subsequent operations are also clear from FIG. 6; $\Delta r$ and D are added to ir, or the position of each pixel in the input image data R, so as to calculate Ir, or the pixel position for the image data R that has been corrected for lateral chromatic aberration and distortion; $\Delta b$ and D are added to ib, or the position of each pixel in the input image data B, so as to calculate Ib, or the pixel position For the image data B that has been corrected for lateral chromatic aberration and distortion; then, D is added to ig, or the position of each pixel in the input image data G, so as to calculate Ig, or the pixel position for the image data G that has been corrected for lateral chromatic aberration and distortion.

The process then goes into the enlarging/contracting section 51B, where image scaling is performed by interpolation (N-fold interpolation) of the image data in accordance with a desired ratio of enlargement or contraction using the pixel positions, Ir, Ig and Ib that have been corrected for lateral chromatic aberration and distortion. Thus, image data that has been corrected for lateral chromatic aberration and distortion and which has been scaled electronically is outputted to the block 50B.

It should be noted here that if the characteristics data supply subsection 60 does not acquire the camera identifying information or if there are no lens characteristics that correspond to the camera identifying information acquired by the characteristics data supply subsection 60 or if a command is issued for cancelling the correction of lateral chromatic aberration and distortion, the aberration correcting part 51, like the aberration correcting part 56, performs only electronic scaling in the enlarging/contracting section 51B and the resulting image data is supplied into the block 50B.

In the embodiment under consideration, the prescanned image processing section 44 has the aberration correcting part 51 which is the same as the aberration correcting part 56 in the fine scanned image processing section 46. This is in order to ensure that when aberrational correction is done, the result of the correction can be checked or verified by looking at the image displayed on the verification monitor 20. More specifically, the purpose of providing the aberration correcting part 51 is as follows. If a print area (e.g. the area of a scanned image that is to be outputted as a print) can be displayed together with the aberration corrected image or in the case where only the aberration corrected image that agrees with the print area can be displayed, the aberration correcting part 51 provides a clear scope of the vignetting that occurs in the aberration corrected image so that the displayed print area is enlarged or contracted, or the displayed aberration corrected image is similarly enlarged or contracted. This enables the outputting of a print image having a print area that undergoes minimal or appropriate vignetting and which does not reproduce any non-picture regions.

If correction of lateral chromatic aberration and distortion is performed in the embodiment under consideration, there can be produced a corrected image that is free from color mismatch or distortion. However, the aberrational correction also changes the image size as shown in FIGS. 7a–7d. To deal with this problem, the prescanned image that has been corrected for aberrations is displayed on the monitor 20 so that the user can check and verify the result of the aberrational correction and the area of the print image (i.e., print area) by looking at the image displayed on the monitor.

Figure 7A:
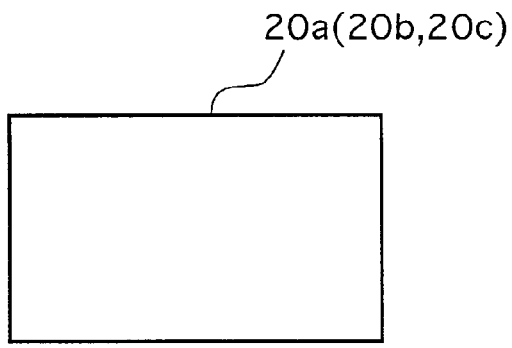
FIG. 7a shows in conceptual form an image displayed on a monitor that is yet to be corrected for aberrations in an embodiment of the image processing method of the present invention.

FIG. 7a shows the image 20a displayed on the monitor which is yet to be corrected for lateral chromatic aberration and distortion. As shown, the image data for the image recorded on the film F that is being outputted from the scanner 12 assumes a rectangular shape that is determined either by the size of the mask used in image reading or by the splicing of an image corresponding to the output image.

The following discussion assumes that the print area 20b agrees with the display screen 20c of the monitor 20 and that the outer rectangular shapes shown in FIGS. 7a–7d represent the display screen 20c of the monitor 20. However, this is not the sole case of the present invention and the outer rectangular shapes shown in FIGS. 7a–7d may represent an image display area that agrees with the print area in the display screen of the monitor 20.

Figure 7B:
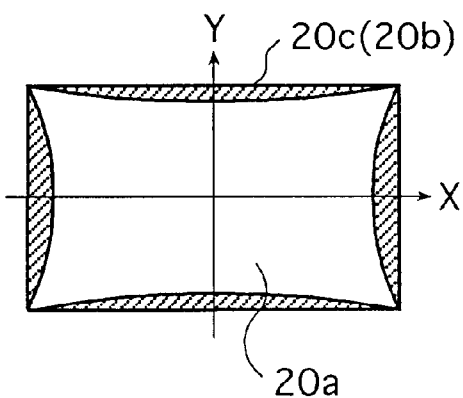
FIG. 7b shows in conceptual form an image displayed on the monitor after it has been corrected for distortion.

On the other hand, the total image data that has been corrected for lateral chromatic aberration and distortion in the coordinates transforming section 51A in the aberration correcting part 51 deforms according to the degrees of lateral chromatic aberration and distortion as shown in FIG. 7b, in which the hatched areas have no image data due to vignetting. For example, if the yet to be corrected image shown in FIG. 7a has a pincushion distortion, the corrected image 20a has such a shape that the central portions of the opposite sides of the rectangle shrink more toward the center than the two end portions in both X- and Y-directions, whereupon portions of the display screen 20c of the monitor fail to reproduce the recorded image as indicated by hatched areas in FIG. 7b. Conversely, if the yet to be corrected image shown in FIG. 7a has a barrel distortion, the corrected image 20a has such a shape that the central portions of the opposite sides of the rectangular bulge more outward than the two end portions in both X- and Y-directions (this case is not shown in FIG. 7) and portions of the display screen 20c of the monitor also fail to reproduce the recorded image.

On the other hand, the printer 16 has desirably such a capability that the image recorded on the film F is reproduced on a print as completely as possible without surplus or deficiency. Therefore, with a photoprinter that intends to produce prints of higher quality, an appropriate electronic scaling ratio is determined in accordance with the size of the input image read with the scanner 12 and the size of the output image and the input image is enlarged or contracted by performing interpolation or removing portions of the image in accordance with the thus determined scaling ratio and the resulting image is outputted as a final print.

In a photoprinter of the stated type, a low-resolution image having the same print area 20b in accordance with the size of the image on an output print is displayed on the monitor 20. In the embodiment under consideration, the image 20c containing non-picture areas (as hatched in FIG. 7b) or an image involving non-displayable areas can be displayed as described above; however, due to a surplus or deficiency of the input picture within the print area 20b, those images cannot immediately be outputted as a print image. Therefore, adjustment need be performed in consideration of the deformation of the input image (displayed on the monitor) that is caused by aberrational correction, so that the input image is enlarged or contracted, for example, the image in the internal rectangular picture region 20b (see FIG. 7c) is enlarged and produced as an output image of a preset print size.

Figure 7C:
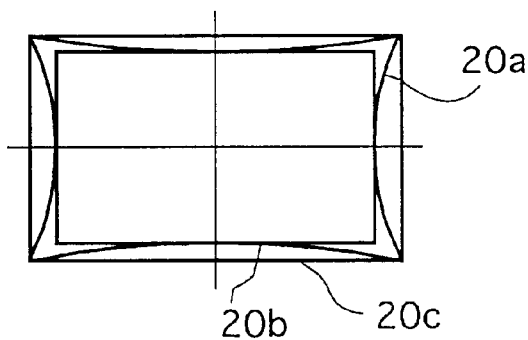
FIG. 7c shows in conceptual form an image to be monitored in accordance with the present invention.
Figure 7D:
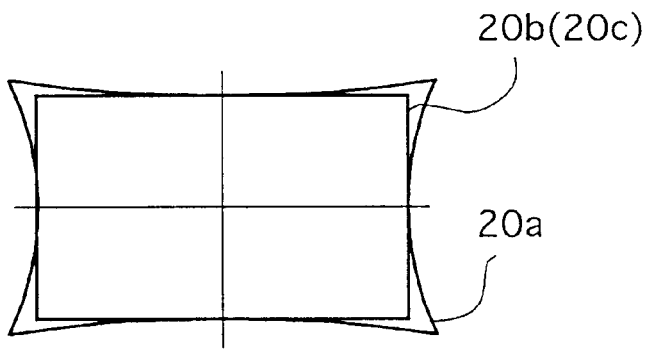
FIG. 7d shows in conceptual form another image to be monitored in accordance with the present invention.

This is inconvenient due to the discrepancy between the image 20a displayed on the monitor and the print area 20b of the image on the output print. On the other hand, it is not easy to determine the electronic scaling ratio such that in accordance with the deformation of the inout rectangular image (as displayed on the monitor) that occurs on account of the aberrational correction, a maximum rectangular input image can be outputted that is neither excessive nor deficient, for example, such that the internal rectangular area 20b that is just inscribed within the deformed rectangular input image becomes an output print area as shown in FIG. 7c. Under these circumstances, the image on the output print may potentially contain non-picture regions. To deal with this problem, the embodiment under consideration is so adapted that the print area 20b that can be enlarged or contracted by the user is displayed on the monitor 20 together with the deformed image 20a resulting from the aberrational correction (see FIG. 7c) and the user enlarges or contracts the print area 20b by means of the manipulative unit 18 such as a keyboard or a mouse so that a maximum image can be reproduced from the deformed display image area 20a. Instead of displaying the print area that can be enlarged or contracted, the embodiment under consideration may be so modified that the image 20a per se that is displayed on the monitor 20 is enlarged or contracted such that the image displayed on the screen 20c of the monitor 20 agrees with the image on the output print, namely, such that the print area 20b agrees with the displayed image 20c (see FIG. 7d).

Being constructed in this way, the embodiment under consideration ensures that the print area resulting from the aberrational correction can be checked or verified on the display screen 20c of the monitor 20.

It should be noted here that instead of displaying on the monitor 20 that portion of the distortion corrected image which is enclosed in a rectangular area that is to be outputted as a print, the range of the yet-to-be-corrected image which lies in the print area to be outputted as a print may be displayed on the monitor 20. In this alternative case, the image displayed on the monitor 20 is yet to be corrected and may occasionally fail to assume a rectangular shape.

If desired, the whole of the rectangular image which is yet to be corrected may be displayed on the monitor 20 and then a non-rectangular area that is to be outputted as a print is displayed. In either case, the range to be outputted as a print can be checked by knowing it before the output print is produced.

In the embodiment under consideration, the image to be displayed on the monitor 20 is subjected to entirely the same corrective measure as applied to the image that is to be outputted as a print. This is not the sole case of the present invention and the same or an equivalent corrective measure may be taken.

Described above is the basic construction of the image processing in the embodiment under consideration.

We now describe the operation of the image processing apparatus in the embodiment under consideration, as well as the image processing method of the same embodiment with particular reference to the image processing apparatus 14a shown in FIG. 5. In the following description, actions that are the same as those performed by the image processing apparatus 14 shown in FIG. 2 will not be described in detail.

In the image processing apparatus 14a shown in FIG. 5, the storage of the prescanned image data into the prescan memory 40, the storage of the fine scanned image data into the fine scan memory 42, the transmission of the camera identifying information into the characteristics data supply subsection 60 and the setting of image processing conditions into the processing subsections 50 and 54 by means of the parameter coordinating subsection 76 are performed in entirely the same manner as in the case of the aforementioned image processing apparatus 14.

Thereafter, the prescanned data is read from the prescan memory 40 and sent to the processing subsection 50.

In the processing subsection 50, the image data is processed by the LUT and MTX in the block 50A and thereafter sent to the aberration correcting part 51. In a separate step, the characteristics data supply subsection 60 uses the acquired camera identifying information to read the corresponding lens characteristics and sends them to the aberration correcting part 51.

In the coordinates transforming section 51A of the aberration correcting part 51, Ir, Ig and Ib which represent the pixel positions that have been corrected for lateral chromatic aberration and distortion are calculated in the manner described above on the basis of the lens characteristics and the pixel positions for the image data. The calculated pixel positions Ir, Ig and Ib are sent to the enlarging/contracting section 51B. Using the supplied pixel positions Ir, Ig and Ib, the enlarging/contracting section 51B electronically scales the image by performing N-fold interpolation of the image data in accordance with the ratio of enlargement or contraction and the resulting image data that has been corrected for lateral chromatic aberration and distortion and which has been subjected to electronic scaling is then sent to the block 50B.

It should be noted that the calculation of the pixel positions Ir, Ig and Ib in the coordinates transforming section 51A may be performed prior to the supply of the image data at the time when the information about the lens characteristics is received from the characteristics data supply subsection 60.

In the block 50B, the image data is subjected to sharpening, dodging and any other necessary image processing steps before it is sent to the image data converting subsection 52, where it is converted to image data suitable for display on the verification monitor 20. The thus converted image data is then sent to the verification monitor 20.

Looking at the display on the verification monitor 20, the operator checks (verifies) the image that has been subjected to the correction of lateral chromatic aberration and distortion and various other processing steps (in other words, the image as the result of the processing) and if necessary, manipulates the aforementioned keys on the keyboard 18a or the mouse 18b to adjust the color/density, gradation and other features of the image; at the same time, he sets the print area 20b by enlarging or contracting it in such a way that it is free from non-picture regions and has appropriate vignetting.

The inputs for this adjustment are sent to the key correcting subsection 47 which, in response to the entered inputs for adjustment, calculates the amounts of correction of the image processing conditions and sends them to the parameter coordinating subsection 76. In response to the supplied amounts of correction, the parameter coordinating subsection 76 corrects the LUTs and MTXs in the blocks 50A and 54A in the processing subsections 50 and 54, respectively, as already mentioned above. The image displayed on the verification monitor 20 also varies in response to this corrective measure, or the inputs for adjustment entered by the operator.

If the operator concludes that the image displayed on the verification monitor 20 is appropriate (verification OK), he manipulates the keyboard 18a or the mouse 18b to give a command for print start, whereupon the image processing conditions are finalized and the fine scanned data is read from the fine scan memory 42 and sent to the processing subsection 54 of the fine scanned image processing section 46.

In the processing subsection 54, the fine scanned data is processed under specified conditions as in the case of the prescanned data, whereupon it is not only corrected for the aforementioned lateral chromatic aberration and distortion but also enlarged or contracted depending on the case; the thus processed fine scanned data is then sent to the image processing subsection 54B.

In the block 54B, the image data is subjected to sharpening, dodging and any other necessary image processing steps before it is sent to the image converting subsection 58, where it is converted to image data suitable for image recording with the printer 16. The thus converted image data is then sent to the printer 16.

If no image verification is to be performed, the image processing conditions are finalized at the point of time when the parameter coordinating subsection 76 ends setting of the image processing conditions in the processing subsection 54 of the fine scanned image processing section 46, and the fine scanned data is automatically processed and sent to the printer 16.

The above-described alternative procedures are preferably selected in terms of operating modes or the like.

In the printer 16, prints are produced and stacked as in the aforementioned case.

In the image processing apparatus 14a shown in FIG. 5, the prescanned image data obtained by prescanning the recorded image with the scanner 12 is used as image data for displaying on the monitor 20 an image that has been subjected to the correction of lateral chromatic aberration and distortion and other image processing steps. This is not the sole case of the present invention and an image processing apparatus of the type generally indicated by 15 in FIG. 8 may be employed. The apparatus shown in FIG. 8 does not use prescanned image data but uses only fine scanned image data and subjects it to the correction of lateral chromatic aberration and distortion and other image processing steps. Thereafter, portions of the corrected image data are removed in a data removing/reducing section 59 so that the image size is reduced. The image is then displayed on the monitor 20 and the displayed image 20a on the display screen 20c is checked and verified. Thereafter, the corrected image data before portions of it are removed are outputted to the printer 16 either as such or after making the necessary correction.

Figure 8:
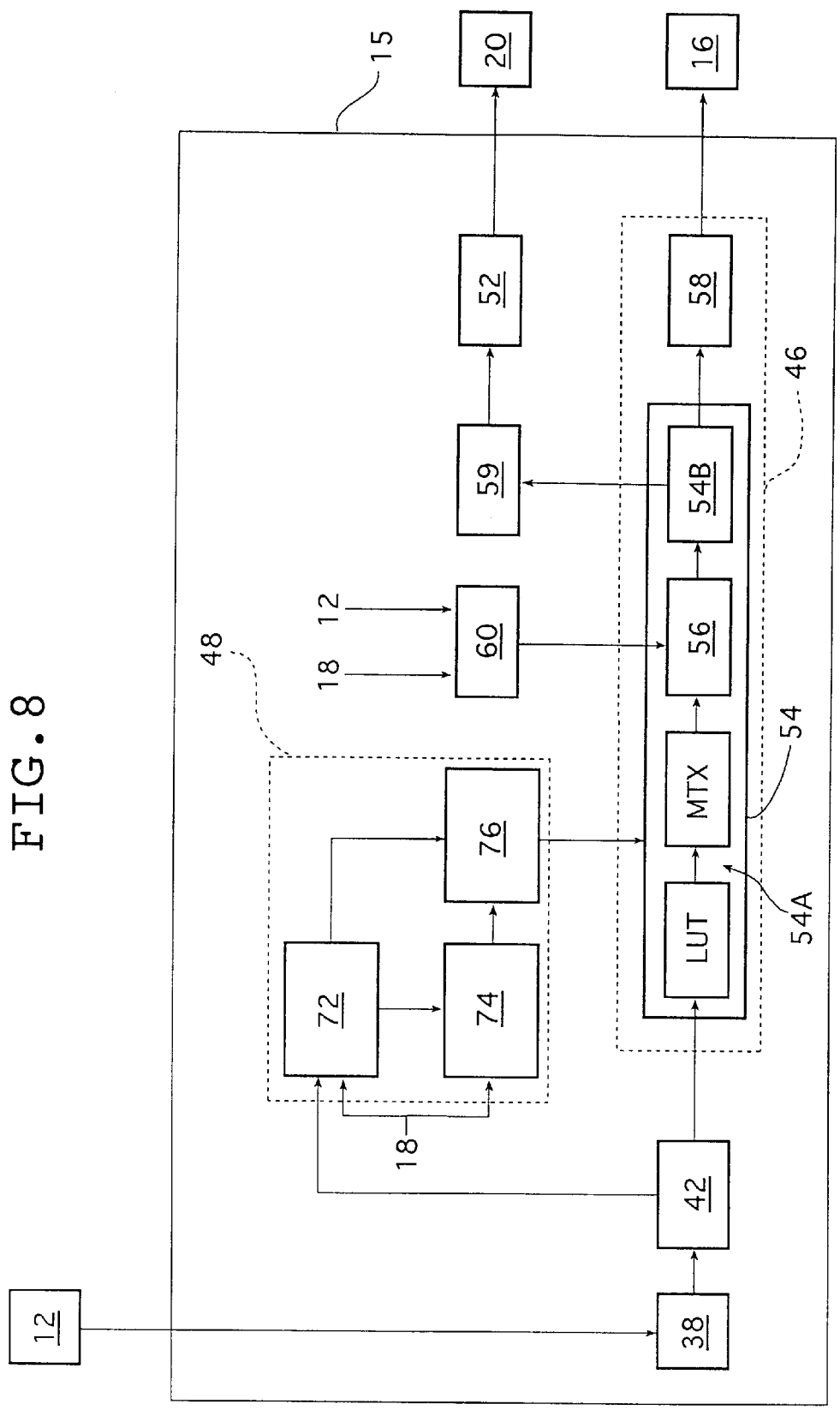
FIG. 8 is a block diagram showing another example of the image processing apparatus of the present invention which is to be applied to the digital photoprinter shown in FIG. 1.

The image processing apparatus 15 shown in FIG. 8 is the same as the image processing apparatus 14a shown in FIG. 5, except on the following points. The former does not have the prescan memory 40 or the image processing subsection 50 of the prescanned image processing section 44. And the output of the block 54B in the image processing subsection 54 of the fine scanned image processing section 46 is connected not only to the print image data converting subsection 58 but also to the monitor display image data converting subsection 52 via the removing/reducing section 59. Therefore, like components are identified by like numerals and will not be described in detail.

The removing/reducing section 59 in the image processing apparatus 15 of FIG. 8 is provided between the block 54B in the image processing unit 54 of the fine scanned image processing section 46 and the monitor display image data converting subsection 52. In this section 59, the high-resolution, fine scanned image data that is supplied from the block 54B after it has been corrected for aberrations such as lateral chromatic aberration and distortion has portions of it removed or it is reduced in size so that it will have an image size and pixel density comparable to those for the monitor 20, whereby it is converted to low-resolution image data for display on the monitor.

As in the case of the image processing apparatus 14a shown in FIG. 5, the high-resolution, fine scanned image data read with the scanner 12 in the image processing apparatus 15 of FIG. 8 is subjected to various data processing steps in the data processing section 38 and thereafter stored in the fine scan memory 42. Subsequently, the setting subsection 72 of the conditions setting section 48 reads the fine scanned image data out of the frame memory 42, sets image processing conditions and sends them to the parameter coordinating subsection 76 together with the commands and various pieces of information entered by touching keys on the manipulative unit 18. The image processing conditions are forwarded from the parameter coordinating subsection 76 into the image processing subsection 54 of the fine scanned data processing section 46. In a separate step, the camera or lens associated magnetic information that has been read with the scanner 12 and the camera or lens associated information and lens characteristics that have been entered by touching keys on the manipulative unit 18 are sent to the characteristics data supply section 60, which reads the lens characteristics on the basis of the camera or lens related information and sends them to the aberration correcting part 56.

In the next step, the image data is read out of the frame memory 42 and sent to the processing unit 54, where it is subjected to specified image processing steps under the image processing conditions sent from the parameter coordinating subsection 76 (by means of LUT and MTX in the block 54A where those conditions are set) and thereafter fed into the aberration correcting part 56. Being supplied with the lens characteristics from the characteristics data supply section 60, the aberration correcting part 56 corrects the image data for any lateral chromatic aberration and distortion on the basis of the lens characteristics and the pixel information for the image data (e.g. the distance of each pixel from the center of the image) and, at the same time, performs electronic scaling at a ratio that has been set to ensure that the corrected image will be outputted in a specified print size. As a result, there is generated aberration corrected image data of an appropriate print size which is then outputted to the block 54B.

The aberration corrected image data of an appropriate print size has high resolution, so it is sent from the block 54B into the removing/reducing section 59, where portions of it are removed or it is reduced in size so that it is converted to low-resolution image data having an image size and pixel density suitable for display on the monitor. The low-resolution image data is then outputted to the image data converting section 52, where it is converted to monitor display image data and outputted to the monitor 20. On the basis of the entered monitor display image data, the monitor 20 displays an aberration-corrected, reproduced image and it also displays a print area.

If the displayed print area is not appropriate with reference to the corrected image on the monitor 20, the operator operates the manipulating unit 18 to enlarge or contract the print area so that it is set in the corrected image range which is neither excessive nor deficient. At the same time, the information about enlargement or contraction of the print area is sent to the conditions setting section 48 or the characteristics data supply section 60, from which it is forwarded to the aberration correcting part 56 of the processing subsection 54, so that the electronic scaling ratio is adjusted in the enlarging/contracting section 56B of the aberration correcting part 56. As a result, aberration corrected data of an appropriate print size that is neither excessive nor deficient is generated again and displayed on the monitor 20 in the same manner as described above.

When the image displayed on the monitor has been verified to have an appropriate size, the generated image data that has been corrected for aberrations is outputted to the block 54B, which sends the data to the print image data converting subsection 58, where it is converted to print image data and outputted to the printer 16.

Described above is the basic construction of the image processing apparatus 15 shown in FIG. 8.

Figure 9:
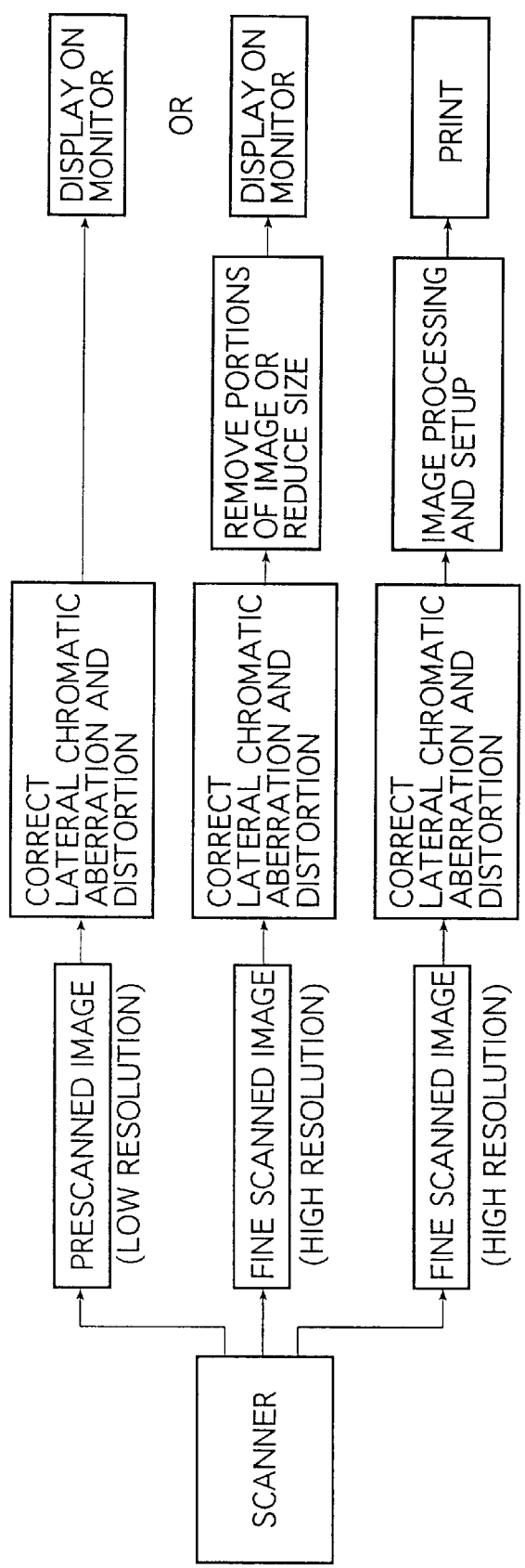
FIG. 9 shows in conceptual form how image data is outputted to a monitor and a printer from the image processing apparatus of the present invention.

In the image processing apparatus 14a and 15 shown in FIGS. 5 and 8, respectively, the image data to be displayed on the monitor 20 as well as the image data to be outputted to the printer are not only corrected for aberrations such as lateral chromatic aberration and distortion but also subjected to other image processing steps. This is not the sole case of the present invention and various modifications may be adopted as shown in FIG. 9. The image processing apparatus may be so adapted that the high-resolution, fine scanned data for production of prints that has been read with the scanner is corrected for lateral chromatic aberration and distortion and thereafter subjected to other image processing steps and setup operations. In addition, if prescanned image data is to be used in monitoring image data and even in the case where fine scanned image data is to be used in monitoring, the image processing apparatus may be so adapted that such monitoring image data are only subjected to aberrational correction and immediately displayed on the monitor without any other image processing steps and setup operations.

Described above are the basic compositions of the image processing method according to the first aspect of the present invention and the image processing apparatus according to its third aspect.

As described above in detail, according to the first and third aspects of the present invention, even the image recorded on a film with lens or taken with an inexpensive compact camera or a digital camera can be effectively processed to correct lens aberrations such as lateral chromatic aberration, distortion, decrease in the brightness of the edge of image field and defocusing and, hence, high-quality images that are free from color mismatch, distortion, uneven brightness, blurring and any other defects can be outputted consistently.

In a preferred embodiment of the first and third aspects of the present invention, even the image recorded on a film with lens or taken with an inexpensive compact camera or a digital camera can be effectively processed to correct distortion without causing vignetting and, hence, high-quality images that are free from both vignetting and distortion can be outputted consistently.

In a further embodiment of the first and third aspects of the present invention, even the image recorded on a film with lens or taken with an inexpensive compact camera or a digital camera can be effectively processed to correct lateral chromatic aberration and distortion and, hence, a high-quality image that is free from color mismatch and distortion can be displayed on an image display device, thus allowing the operator to perform verification based on the displayed image and achieve consistent outputting of image-carrying prints.

If the foregoing embodiments are adapted to display a print area on the image display device together with a color corrected image free from mismatch and distortion, the range of non-picture areas of the image and vignetting that have been caused by aberrational correction can be delineated clearly so that the image area that is to be produced as a picture on output print can be visually checked and verified by the user in a simple and yet positive way. As a result, prints of an appropriate size that contain a neither excessive nor deficient image can be outputted consistently.

The image processing method according to the first aspect of the present invention and the image processing apparatus according to its third aspect are intended to perform correction of the above-described various aberrations in the case where the information about the lens used to take a picture of the subject and its lens characteristics are known. This is not the sole case of the present invention and the aberrations of interest can be corrected even if the information about the taking lens or its lens characteristics are not known. This is the characterizing part of the image processing method according to the second aspect of the invention and the image processing apparatus according to its fourth aspect.

Figure 10:
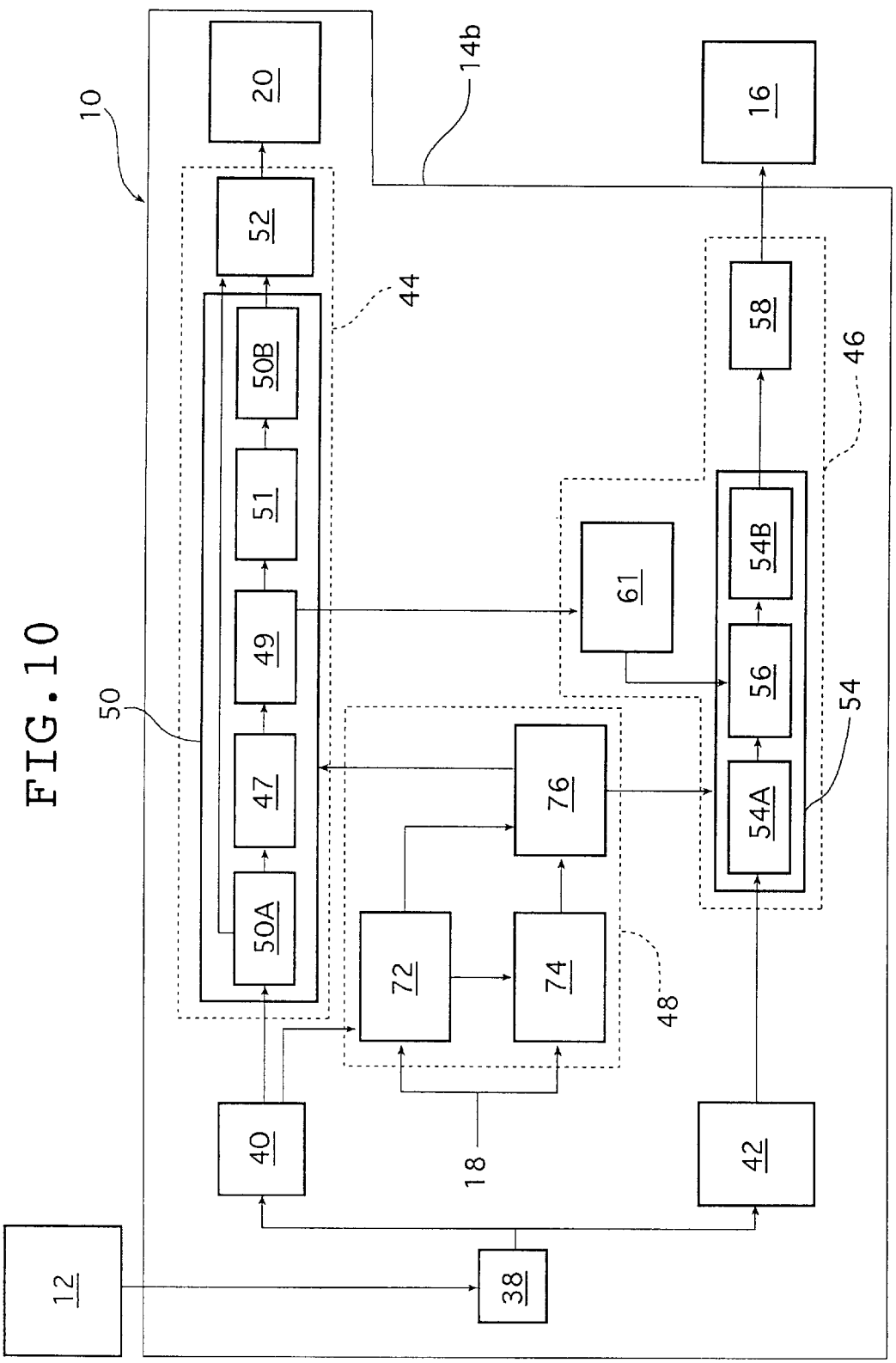
FIG. 10 is a block diagram showing yet another example of the image processing apparatus of the present invention which is to be applied to the digital photoprinter shown in FIG. 1.

FIG. 10 is a block diagram showing an example of the image processing apparatus according to the fourth aspect of the present invention, which implements the image processing method according to its second aspect.

Like the image processing apparatus 14a shown in FIG. 5, the image processing apparatus 14b shown in FIG. 10 is intended to be applied to the digital photoprinter of FIG. 1. The two apparatus are completely the same except for the following three points. First image processing apparatus 14b has an aberration characteristics detecting subsection 47 and an aberration characteristics adjusting subsection 49 between the block 50A and the aberration correcting part 51 in the processing subsection 50 of the prescanned image processing section 44. Secondly the, lens characteristics data supply subsection 60 for acquiring camera identifying information and information about lens characteristics per se from the scanner 12 and the manipulative unit 18 is replaced by a characteristics data supply section 61 that does not acquire such information and which is provided for the processing subsection 54 of the fine scanned image processing section 46. Third and the image processing apparatus 14b has a monitor 20 as an essential component and an aberrational image displayed on the monitor 20 can be subjected to various corrective operations by the manipulative unit 18. Hence, like components are identified by like numerals and will not be described in detail.

The processor 14b shown in FIG. 10 has a data processing section 38, a prescan (frame) memory 40, a fine scan (frame) memory 42, a prescanned image processing section 44, a fine scanned image processing section 46, a conditions setting section 48, and the monitor 20.

The prescan memory 40 and the fine scan memory 42 are each loaded with digitized data that has been processed in the data processing section 38; if necessary, the data may be accessed by the prescanned image processing section 44 or the fine scanned image processing section 46 for image processing and outputting of the result.

The prescanned image processing section 44 has a processing subsection 50 and an image data converting subsection 52. The processing subsection 50 comprises a block 50A, the aberration characteristics detecting subsection 47 that detects the characteristics of lateral chromatic aberration and distortion, the aberration characteristics adjusting subsection 49 that adjusts the intensity of aberrational correction, an aberration correcting part 51 (which, together with 47 and 49, forms the characterizing portion of the present invention) and a block 50B. The aberration characteristics detecting subsection 47, the aberration characteristics adjusting subsection 49 and the aberration correcting part 51 are aberration characteristics detecting means, aberration characteristics adjusting means and aberration correcting means, respectively, which characterize the image processing apparatus according to the fourth aspect of the present invention. In these means, the image processing method according to the second aspect of the present invention is implemented.

The fine scanned image processing section 46 is composed of a processing subsection 54, the characteristics data supply subsection 61, and an image data converting subsection 58. The processing subsection 54 comprises a block 54A, an aberration correcting part 56 for correcting the aberrations in the fine scanned data, and a block 54B.

The characteristics data supply subsection 61 stores the detected aberration characteristics after the intensity of aberrational correction has been adjusted in the aberration characteristics adjusting subsection 49. The stored data is supplied from the subsection 61 when the fine scanned data is corrected for aberrations in the aberration correcting part 56.

In the aberration correcting part 56, aberrations are corrected in terms of the aberration characteristics supplied from the characteristics data supply subsection 61 after the intensity of aberrational correction has been adjusted and, in addition, electronic scaling is performed by a specified procedure in accordance with the size of the image to be outputted as a print.

The yet to be corrected image is displayed on the monitor 20 and, looking at the display, the operator specifies a subject of interest in the image and detects the aberration characteristics based on the image data for the specified subject or adjusts the intensity of correction of the aberration characteristics while looking at the image displayed on the monitor 20.

Further referring to the processor 14b, the prescanned data stored in the prescan memory 40 is subjected to color balance adjustment, brightness correction, contrast correction and saturation correction in the image processing block 50A and sent directly to the image data converting subsection 52 without passing through the aberration characteristics detecting subsection 47, the aberration characteristics adjusting subsection 49 and the aberration correcting part 51; in the image data converting subsection 52, the prescanned data is processed by 3D-LUT and like means into image data corresponding to the display on the monitor 20 and subsequently displayed on the monitor 20.

This procedure is described below more specifically with reference to FIG. 11. First, as shown in FIG. 11a, the user, looking at the image displayed on the monitor 20, notes a subject 70 which should ideally be linear (as exemplified by a column) and determines as to whether the distortion of the subject of interest, or the deviation from the ideal linear form, is tolerable or not. If the user concludes that there is a need to correct the distortion, the subject of interest on the displayed image is marked in at least two points by manipulating the keyboard 18a or the mouse 18b. In FIG. 11a, two marks 70a and 70b are indicated. The subject 70 is preferably marked in its edge and end portions because this enables precise extraction of the image data for the subject. A straight line 70c connecting the two or more marks may safely be regarded as representing the ideal subject.

When determining the coordinates of the subject of interest 70 on the image data, the operator may trace the subject 70 directly by means of the mouse 18b or the like; alternatively, the operator may designate a certain area including the subject 70 and evaluates the change in the image density in that area so that the coordinates of the subject 70 on the image data are determined automatically. Subsequently, an equation for correcting the coordinates of the thus selected subject 70 to those of the ideal line 70c on the image data is calculated. In calculating the correction equation, the distortion characteristics can be detected by relying upon the position information for the image data (e.g. x-y, or the coordinates of a pixel from the center of the image) so as to determine the coefficients for the respective orders in a cubic function having the position information as a parameter. This is possible by utilizing the following theory already described above. That is, the distortion characteristics of a lens can generally be approximated to a reasonable extent by a cubic function having as a parameter the distance of a pixel from the optical axis of the lens, namely, the center of the image recorded on the film F (the distance may be expressed by x-y).

It should be noted that the detected distortion characteristics are usually expressed in terms of the image data for color G which is the reference for the other two primary colors.

The lateral chromatic aberration characteristics are detected by calculating an equation for correcting lateral chromatic aberration in which the P and B images are brought into agreement with the G image in order to correct the color mismatch due to the lateral chromatic aberration. In the embodiment under consideration, the lateral chromatic aberration characteristics are detected using the color mismatch in the subject of interest 70. In calculating the correction equation, the lateral chromatic aberration characteristics are detected by relying upon the position information for the image data (e.g. x-y, or the coordinates of a pixel from the center of the image) so as to determine the coefficients for the respective orders in a cubic function having the position information as a parameter in the same manner as employed in detecting the distortion characteristics. This is possible by utilizing the following theory already described above: the lateral chromatic aberration characteristics of a lens as well as its distortion characteristics can generally be approximated to a reasonable extent by a cubic function having as a parameter the distance of a pixel from the optical axis of the lens, namely, the center of the image recorded on the film F (the distance may be expressed by x-y).

Using the thus detected aberration characteristics and also using one of the three primaries R, G and B, typically G, as a reference color, the image magnifications of R and B are converted such that the R and B images match the G image, whereupon the lateral chromatic aberration is corrected, followed by the correction of distortion. On the basis of the corrected aberrations, the appropriate position of each pixel is calculated and mathematical operations are accordingly performed to interpolate the image data for the respective pixels, thereby producing image data that has been corrected for the lateral chromatic aberration and distortion of the image recorded on the film.

In the foregoing example, the detection of aberration characteristics and the correction of aberrations are directed to both distortion and lateral chromatic aberration; however, this is not the sole case of the present invention and either distortion or lateral chromatic aberration may be the only aberration that need be corrected.

In the aberration characteristics adjusting subsection 49, the intensity of correction of the aberration characteristics detected by the user based on the image displayed on the monitor 20 is adjusted. The monitor 20 displays an image including the aforementioned subject 70 that has been adjusted in the detected aberration characteristics and subsequently corrected for aberrations. In fact, the correction of the aberration characteristics detected on the basis of the subject 70 may be too strong or too weak. To deal with this difficulty, the adjusting subsection 49 is provided with such a means that an image is displayed that includes the subject that has been corrected for aberration with the intensity of the detected aberration characteristics being varied in 3-5 stages so that the user can select the aberration characteristics he finds optimal.

Specifically, the means is such that the user, looking at the monitor screen, can enter a command from the keyboard 18a, the mouse 18b or a correcting key (not shown) so that he can select a presumably optimal correction intensity from a range of three levels, STRONG, MEDIUM and WEAK, or five levels, +2, +1, N, −1 and −2.

Although not shown, the same means is provided for the lateral chromatic aberration characteristics; checking for any color mismatch in the subject 70 in the image on the monitor 20, the user enters a command from the keyboard 18a so that he can select a presumably optimal correction intensity from a range of three levels, STRONG, MEDIUM and WEAK, or five levels, +2, +1, N, −1 and −2. It should be noted that the number of stages in which the correction intensity can be varied in the present invention is by no means limited to 3, 4 or 5.

Figure 11B:
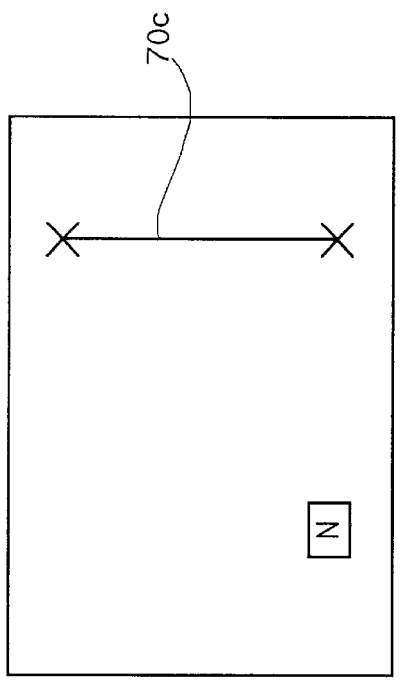
FIGS. 11a–11c are monitor screens displaying three images of a subject that have been corrected for aberrations in another embodiment of the image processing method of the present invention.

FIG. 11b shows an example of the image that is displayed on the monitor 20 right after adjustment in the aberration characteristics adjusting subsection 49. The subject 70 has been corrected to 70c in accordance with the aberration characteristics detected in the aberration characteristics detecting subsection 47 but, in practice, the level of correction intensity can be increased from the center value N (representing the thus detected aberration characteristics which enable the subject 70 to be corrected to a linear form) to the positive side (+1 and +2) or decreased to the negative side (−1 and −2), thereby producing a plurality of aberration corrected images, from which the image the user finds optimal can be selected.

Figure 11D:
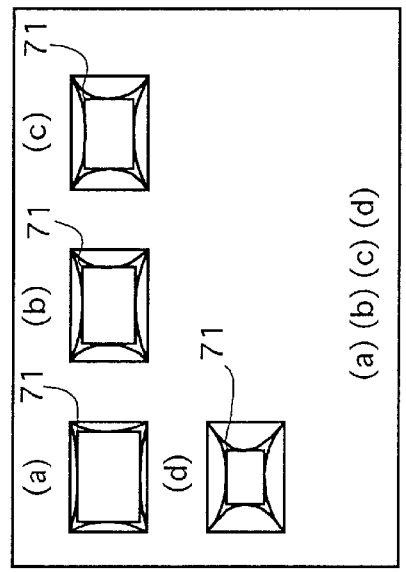
FIG. 11d is a monitor screen displaying an image that has been corrected for aberrations in still another embodiment of the image processing method of the present invention.
Figure 11A:
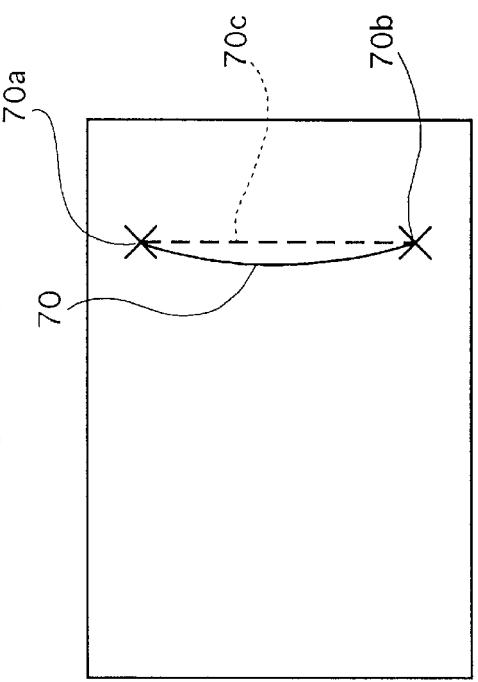
Figure 11C:
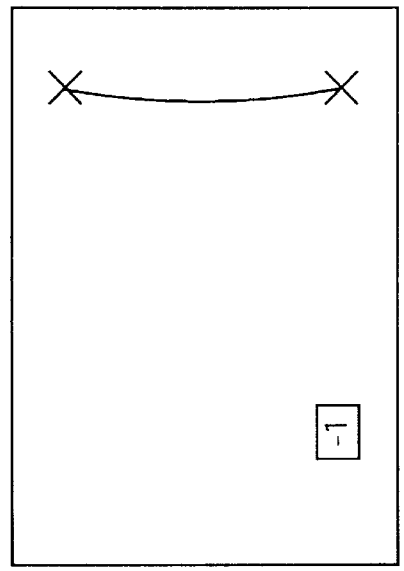

FIG. 11c shows an image that has been aberration corrected at a lower intensity level (−1). By entering a command from the keyboard 18a, the user can select an optimal intensity level from the set of indicators +2, +1, N, −1 and −2 that selectively appear at the bottom of the screen of the monitor 20 which displays the image corrected at the selected intensity level. It should be noted here that depending on the characteristics of the taking lens, the aberration characteristics may be of a pincushion type or a barrel type, so the apparatus is preferably adapted to permit the user to select either type depending on the image displayed on the monitor. In the illustrated case, the user selects an optimal image from the set consisting of the image as corrected in accordance with the aberration characteristics detected in the aberration characteristics detecting subsection 47 and images that have been corrected at varying intensity levels. This is not the sole case of the present invention and an optimal image may be selected from the set of images that have been corrected in accordance with a group of preset typical aberration characteristics.

In the case under consideration, the user adjusts the aberration characteristics while looking at the aberration corrected image on the monitor 20, which actually displays an image that has been aberration corrected in the aberration correcting part 51.

To correct aberrations, one of the three primaries R, G and B, typically G, is used as a reference color and the image magnifications of R and B are converted such that the R and B images match the G image, whereupon the lateral chromatic aberration is corrected and, thereafter, the distortion is corrected. On the basis of the corrected aberrations, the appropriate position of each pixel is calculated and mathematical operations are accordingly performed to interpolate the image data for the respective pixels, thereby producing image data that has been corrected for the lateral chromatic aberration and distortion of the image recorded on the film.

The aberration corrected, prescanned image data is subjected to sharpening, dodging and other necessary steps in the block 50A in accordance with a user's command, the image data or the like and thereafter converted in the image data converting subsection 52 into an image suitable for display on the monitor 20.

FIG. 11d shows yet another modification of the aberration characteristics adjusting subsection 49, in which the image as corrected in accordance with the detected aberration characteristics and a plurality of images that have been corrected for aberrations with the intensity of correction of the detected aberration characteristics being varied in 3–5 stages are displayed simultaneously in split areas of the monitor screen.

The user must check the corrected image as it appears on the monitor 20 since a rectangular image produced by correcting the distortion may sometimes undergo "vignetting" and fail to represent non-picture areas around the image. It is not desirable to output a print showing an image with vignetting, so in order to ensure that a rectangular image without vignetting is outputted in a size compatible with a designated output print size, it is necessary that the image be slightly enlarged until its peripheral area is cut off to create a rectangular image that is free from vignetting and which has the designated output print size. It should however be noted that the peripheral area of the image being cut off may include that part of the subject which should not inherently be cut off. In particular, the peripheral area of the image that is cut off in order to ensure that a rectangular image free from vignetting is outputted in a size compatible with the designated output print size varies with the intensity of correction of distortion; hence, the user must check to see if the peripheral area of the image being cut off does not include any part of the subject that should not inherently be cut off.

The images displayed under (a)–(d) in FIG. 11d are those which have been corrected for aberrations in accordance with the intensity levels that were preliminarily set on the basis of the aberration characteristics detected in the aberration characteristics detecting subsection 47.

According to another method, there is set a print output frame 71 that is to be eventually outputted as a print and check is made to see if a presumably important part of the subject is present exterior to the frame. Looking at the display screen, the user makes an overall evaluation including the possibility of cutting of an important part of the subject and the presence of any color mismatch or distortion in the image and finally determines the image to be outputted.

When the user has adjusted the aberration characteristics in the aberration characteristics adjusting subsection 49, the thus adjusted characteristics are sent to the characteristics data supply subsection 61 and stored in a memory (not shown).

The fine scanned data stored in the fine scan memory 42 is read into the fine scanned image processing section 46 as already described above and, after being subjected to the aforementioned various image processing steps in the block 54A in the processing subsection 54, the data is sent to the aberration correcting part 56.

As already mentioned above, the aberration correcting part 56 performs correction of distortion and lateral chromatic aberration, as well as electronic scaling. The aberration correcting part 56 is also connected to the characteristics data supply subsection 61 that stores the detected aberration characteristics after they have been adjusted by the user in the aberration characteristics adjusting section 49, so that data about the thus adjusted aberration characteristics is supplied to the aberration correcting part 56. The processor 14b shown in FIG. 10 is such that using the aberration characteristics and the pixel positions for the image data (the distance of each pixel from the center of the image, namely, the optical axis) as already mentioned above, image processing is done to correct the distortion and lateral chromatic aberration of the image recorded on the film F in the same manner as the prescanned data is corrected for the lateral chromatic aberration and distortion. This process enables consistent outputting of prints reproducing a high-quality image free from any distortion and color mismatch.

The image data that has been aberration corrected by the aberration correcting part 56 is subjected to sharpening, dodging and other necessary steps in the block 54B in accordance with an operator's command, the image data or the like and thereafter converted in the image data converting subsection 58 into image data suitable for the printer 16, to which it is subsequently outputted.

In the printer 16, prints are produced and stacked as already mentioned above.

Referring further to the image processing apparatus 14b shown in FIG. 10, the image data to be processed in the aberration characteristics detecting subsection 47 and the aberration characteristics adjusting subsection 49 is low-resolution, prescanned image data that is produced by prescanning with the scanner as shown in FIG. 9. This is not the sole case of the invention and the fine scanned image data may alone be used to detect and adjust aberration characteristics before aberrational correction is performed. In this alternative case, if the image is to be displayed on the monitor as shown in FIG. 9, portions of the corrected image data which is fine scanned image data and hence has high resolution may be removed so that the pixel density of the data becomes compatible with the output pixel density for the monitor 20, or the image size may be reduced to a suitable level for display on the monitor 20.

Figure 12:
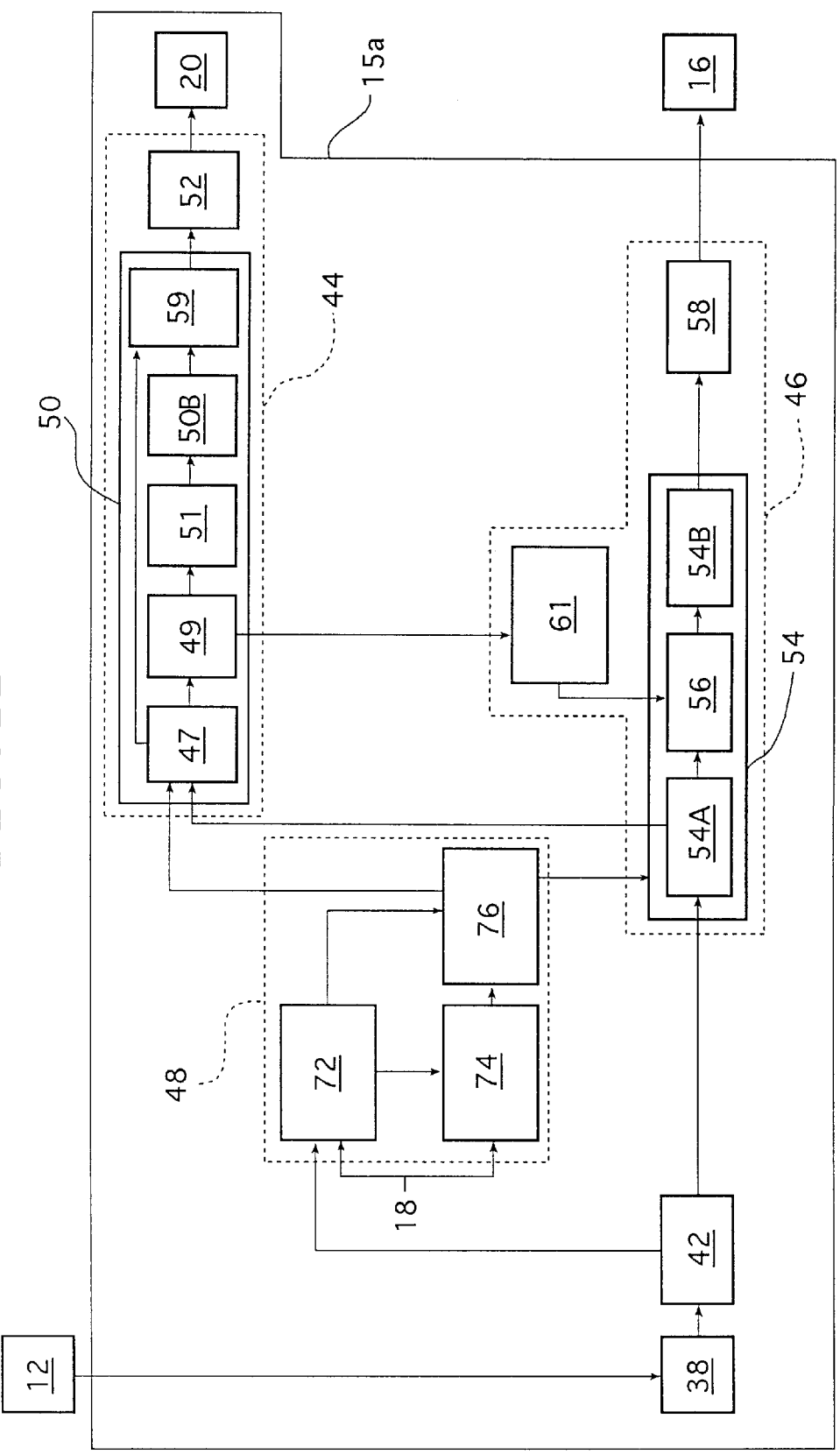
FIG. 12 is a block diagram showing still another example of the image processing apparatus of the present invention which is to be applied to the digital photoprinter shown in FIG. 1.
Figure 13:
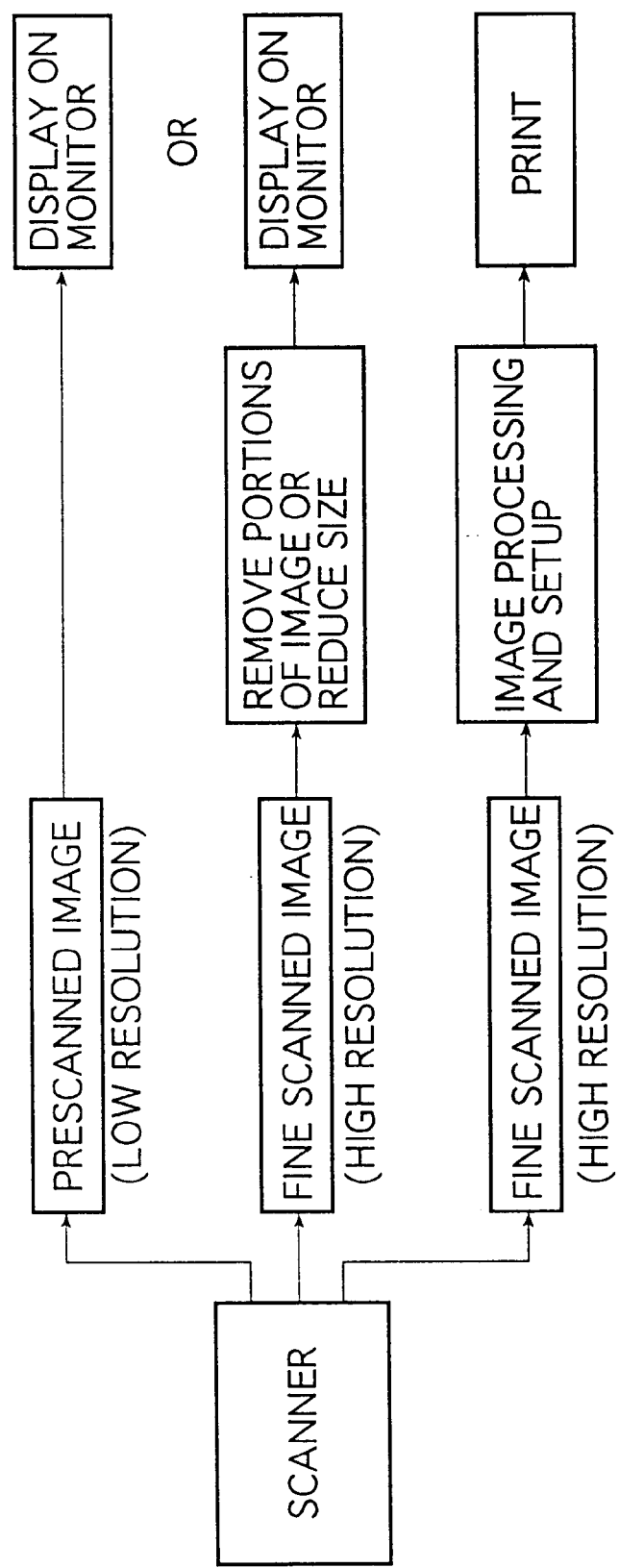
FIG. 13 shows in conceptual form how image data is outputted to a monitor and a printer from a conventional image processing apparatus.

FIG. 12 is a block diagram showing another example of the image processing apparatus that detects and adjusts aberration characteristics using the fine scanned image data alone and which thereafter corrects aberrations.

The image processing apparatus generally indicated by 15a in FIG. 12 is another example of the present invention in which the aforementioned fine scanned image data is used to detect and adjust aberration characteristics. It is the same as the image processing apparatus 14 of FIG. 10 except on the following points: it does not have prescan memory 40; the processing subsection 50 of the display image processing section 44 does not have block 50A but block 50B is connected to a monitor image converting subsection 52 via the removing/reducing subsection 59 for removing portions of the aberration corrected, fine scanned image data or reducing its size. Therefore, like components are identified by like numerals and will not be described in detail.

As in the case of the image processing apparatus 14b shown in FIG. 10, the fine scanned, high-resolution image data read with the scanner 12 in the image processing apparatus 15a of FIG. 12 is subjected to various data processing steps in the data processing section 38 and thereafter stored in the fine scan memory 42. Subsequently, the setting subsection 72 of the conditions setting section 48 reads the fine scanned image data out of the frame memory 42, sets image processing conditions and sends them to the parameter coordinating subsection 76 together with the commands and various pieces of information entered by touching keys on the manipulative unit 18. The image processing conditions are forwarded from the parameter coordinating subsection 76 into the image processing subsection 54 of the fine scanned data processing section 46. Subsequently, the image data is read out of the frame memory 42, sent to the processing subsection 54 where it is subjected to specified image processing steps under the image processing conditions sent from the parameter coordinating subsection 76 and thereafter sent to the aberration characteristics detecting subsection 47.

As in the case of the image processing apparatus 14b, the operator detects the aberration characteristics in the aberration characteristics detecting subsection 47 and keeps an eye on the monitor 20 while adjusting the detected aberration characteristics in the aberration characteristics adjusting subsection 49. For display on the monitor 20, the fine scanned image data which has high resolution is first sent to the removing/reducing subsection 59, where portions of it are removed or it is reduced in size so that it is converted to low-resolution image data having an image size and a pixel density that are compatible with display on the monitor. The resulting image data is then outputted to the image data converting subsection 52, where the supplied aberration corrected, low-resolution image data is converted to a form suitable for display on the monitor 20, to which it is subsequently outputted.

The aberration characteristics detecting subsection 47, the aberration characteristics adjusting subsection 49 and the aberration correcting part 51 in the image processing apparatus 15a of FIG. 12 perform the same functions as in the image processing apparatus 14b of FIG. 10.

When the user has adjusted the detected aberration characteristics in the aberration characteristics adjusting subsection 49, the thus adjusted aberration characteristics are sent to the characteristics data supply subsection 61 and stored in a memory (not shown).

In a separate step, the fine scanned data stored in the fine scan memory 42 is subjected to various image processing steps and aberrational correction in the processing subsection 54 of the fine scanned image processing section 46 as in the case of the image processing apparatus 14b of FIG. 10. Thereafter, the aberration corrected image data is sent to the image data converting subsection 58, where it is converted to image data suitable for the printer 16, to which it is subsequently outputted.

As a result of this procedure, the image corrected for aberrations in accordance with the aberration characteristics adjusted in the aberration characteristics adjusting subsection 49 can be outputted as a print.

As in the first and third aspects of the present invention, not only the lateral chromatic aberration and distortion that result from the taking lens but also the decrease in the brightness of the edge of image field, defocusing and other aberrations that also result from the taking lens may be corrected simultaneously in the second and fourth aspects of the invention.

Described above are the basic compositions of the image processing method according to the second aspect of the present invention, as well as the image processing apparatus according to its fourth aspect.

As described above, according to the second and fourth aspects of the present invention, the image recorded on a film with lens or taken with an inexpensive compact camera or a digital camera, even if no information is available for the taking lens or the film and there is no way to know the aberration characteristics of the image data, can be corrected for aberrations on the basis of the distortion and lateral chromatic aberration characteristics of the image which the user determines optimal. In addition, the user while looking at the image displayed on an image display device can allow the printer to output high-quality prints reproducing a high-quality image that is found optimal in the absence of distortion and color mismatch.

While the image processing method and apparatus according to various aspects of the present invention have been described above with reference to diverse embodiments, it should be understood that the present invention is by no means limited to the foregoing aspects and embodiments and various improvements and modifications can be made without departing from the spirit and scope of the invention.

What is claimed is:

1. An image processing method, comprising:
   obtaining input image data from an image which is recorded optically with a taking lens; and
   applying specified image processing to the obtained input image data to produce output image data that can be reproduced as a visible image,
   wherein at least one aberration of said optically recorded image selected from among lateral chromatic aberration, distortion, decrease in the brightness of the edge of image field and image blurring, is corrected based on lens characteristics of said taking lens and position information of said image.

2. The method according to claim 1, wherein said position information is pixel position information of said recorded image.

3. The method according to claim 1, wherein said position information is referenced to an optical axis of said taking lens used in recording of said image.

4. The method according to claim 1, wherein said lens characteristics are obtained from separately acquired information about the taking lens.

5. The method according to claim 1, wherein correction of said distortion is accompanied by electronic scaling at a higher-than-steady ratio.

6. The method according to claim 5, wherein said higher-than-steady ratio cancels image dropout resulting from the correction of said distortion.

7. The method according to claim 1,
wherein said visible image is both a printed image and a displayed image,
wherein said output image data includes image data for outputting said printed image from a printer, and image data for display on an image display device, and
wherein both of said image data for output and display is subjected to the correction of said at least one aberration.

8. An image processing method, comprising:
obtaining input image data from an image which is recorded optically with a taking lens; and
applying specified image processing to the obtained input image data to produce output image data,
wherein at least one aberration characteristic selected from lateral chromatic aberration and distortion characteristics of said taking lens is detected based on said input image data, and
wherein at least one aberration selected from said lateral chromatic aberration and distortion is corrected based on the detected aberration characteristic and on position information of said image.

9. The method according to claim 8, wherein said step of detecting an aberration characteristic further includes:
displaying said image on an image display device based on said input image data;
obtaining at least two points of position information which specifies a subject to be corrected for said selected at least one aberration;
extracting said subject between said at least two points based on said input image data;
acquiring the position information of said subject before said at least one aberration is corrected, wherein the corrected position information of said subject is predictably acquired between said at least two points; and
calculating an aberration equation based on said position information before said at least one aberration and said position information is corrected, wherein said at least one aberration is corrected based on said position information and in accordance with said aberration equation.

10. The method according to claim 9, wherein the position information of said subject before said at least one aberration is corrected, and the corrected position information, both of which are extracted from said input image data, are the position information for an edge of said subject.

11. An image processing apparatus that applies specified image processing to input image data obtained from an image recorded optically with a taking lens, so as to produce output image data that can be reproduced as a visible image, comprising:
an acquiring means for acquiring information that identifies said taking lens;
an image reading means for reading position information of said image;
a storage means for storing lens characteristics associated with a type of said taking lens; and
a correcting means which, in response to the acquired identifying information, receives the corresponding lens characteristics from said storage means, and which corrects at least one aberration of said optically recorded image which is selected from among lateral chromatic aberration, distortion, decrease in the brightness of the edge of image field and image blurring, based on said lens characteristics and said position information.

12. The apparatus according to claim 11, wherein said position information is pixel position information of said recorded image.

13. The apparatus according to claim 11 wherein the position information is referenced to an optical axis of said taking lens.

14. The apparatus according to claim 11, wherein said correcting means has correction equations associated with a plurality of types of said taking lens, and
wherein said storage means stores correction coefficients for said correction equations as lens characteristics in accordance with the type of taking lens.

15. The apparatus according to claim 11, wherein said correcting means calculates corrected image positions for the lateral chromatic aberration of a reference color for three primaries to correct the lateral chromatic aberration of the image, or, calculates corrected image positions for the distortion of the three primaries to correct the distortion of the image, or calculates corrected image positions for the lateral chromatic aberration and distortion of the three primaries for other colors of the image to correct the lateral chromatic aberration and distortion of the image.

16. The apparatus according to claim 15, wherein said correcting means, using the corrected image positions for the lateral chromatic aberration of said three primaries, or the corrected image positions for the distortion of said three primaries, performs electronic scaling using interpolation to perform correction of the lateral chromatic aberration and electronic scaling, and wherein correction of distortion and electronic scaling, or wherein correction of lateral chromatic aberration, distortion and electronic scaling are performed simultaneously.

17. The apparatus according to claim 11, wherein the identifying information is information about said taking lens which is recorded either optically or magnetically on a film for optically recording said image, or which is on a film cartridge.

18. The apparatus according to claim 11, further comprising an apparatus for outputting a print reproducing said output image data as said visible image.

19. The apparatus according to claim 15, wherein said correcting means, based on the acquired identifying information, determines whether it is necessary to correct the distortion of said images,
wherein if correction of distortion is determined necessary, receives the lens characteristics of the associated taking lens from said storage means, corrects the distortion based on said position information and said lens characteristics and performs image processing under conditions, different from when said correction of distortion is determined unnecessary.

20. The apparatus according to claim 19, wherein said image processing further includes performing electronic scaling at a specified ratio associated with the output image, when distortion correction is not effected, but performs said electronic scaling at a higher scaling ratio when distortion correction is effected than when said correction of distortion is not effected.

21. The apparatus according to claim 20, wherein said higher scaling ratio cancels image dropout resulting from said correction of distortion.

22. The apparatus according to claim 20, wherein the electronic scaling ratio is adjusted based on the type of taking lens when said distortion correction is effected.

23. The apparatus according to claim 20, wherein electronic scaling is performed at a specified ratio irrespective of the type of taking lens when said distortion correction is effected.

24. The apparatus according to claim 19, wherein said correcting means corrects distortion by calculating appropriate positions of the respective three primaries based on offsets of the image positions due to said distortion.

25. The apparatus according to claim 20, wherein said correcting means calculates appropriate positions of the respective three primaries based on offsets of the image positions due to distortion, and performs electronic scaling of the image using information about said appropriate positions.

26. The apparatus according to claim 20, wherein said correcting means, prior to calculating the appropriate positions of said respective three primaries, calculates offsets from a reference color for said three primaries of the image positions of other colors in the images which are subject to lateral chromatic aberration and, using the offsets, calculates the appropriate positions of the respective three primaries as corrected for both distortion and lateral chromatic aberration.

27. The apparatus according to claim 20, wherein said electronic scaling ratio differs between vertical and horizontal directions of the image.

28. The apparatus according to claim 11, further comprising an image display device which displays said optically recorded image as a verification image based on the recorded image, wherein said visible image is a printed image, wherein said output image data is image data for outputting said printed image from the printer, wherein said correcting means corrects at least one aberration of said optically recorded image selected from among lateral chromatic aberration, distortion, decrease in the brightness of the edge of image field and image blurring for both the image data for printing and the verification image for display, and wherein, prior to outputting said printed image as corrected by said correcting means, a corrected image for producing said printed image is displayed on said image display device based on display image data as corrected by said correcting means.

29. The apparatus according to claim 28, wherein said corrected display image data is based on low-resolution, prescanned image data, on image data obtained by removing portions of high-resolution, fine scanned image data, or on image data obtained by reducing its size.

30. The image processing apparatus according to claim 28, wherein said corrected display image data and a print area for said printed image are displayed simultaneously on said image display device.

31. An image processing apparatus which obtains input image data from an image recorded optically with a taking lens, and which applies specified image processing to the obtained input image data to produce output image data, comprising:

an image reading device for reading position information of said image;

an image display device for displaying said image;

a detecting means which specifies a subject to be corrected for aberrations that is selected from the displaying image, and which detects at least one aberration characteristic selected from either a lateral chromatic aberration characteristic or a distortion characteristic due to said taking lens; and a correcting means which, based on both said detected aberration characteristic and said read position information, corrects at least the lateral chromatic aberration or the distortion of said optically recorded image.

32. The apparatus according to claim 31, wherein said detecting means obtains at least two points of position information specifying a subject to be corrected for aberrations which is selected from the displayed image displayed, extracts said subject between said at least two points based on said input image data, acquires the position information of said subject before it is corrected for aberrations, said acquired corrected position information being predictable between said at least two points, and calculates an aberration equation based on that position information which has yet to be corrected for aberrations, and based on said corrected position information.

33. The apparatus according to claim 32, wherein the position information to be corrected is position information for an edge of said subject.

34. An image processing apparatus which obtains input image data from an image recorded optically with a taking lens, and which applies specified image processing to the obtained input image data to produce output image data, comprising:

an image reading device for reading position information at said image;

an image display device for displaying said image;

an acquiring means for acquiring at least one aberration characteristic selected from a lateral chromatic aberration characteristic or a distortion characteristic of said taking lens;

a correcting means for correcting the lateral chromatic aberration or the distortion of said recorded image based on both the acquired aberration characteristic and the read position information of said image; and an adjusting means for adjusting correction intensity or aberration pattern of said aberration characteristic used by said correcting means, wherein said image display device displays the image corrected by said correcting means, wherein said adjusting means adjusts different levels of said correction intensity or aberration pattern, wherein a desired correction to the input image data is determined from among a plurality of displayed images that have been corrected by said correcting means in accordance with said adjusted correction intensity or aberration pattern, and wherein the desired corrected image data is output as said output image data.

35. The apparatus according to claim 34, wherein said image display device displays at least one image that has been corrected for aberrations by said correcting means for each adjustment of said correction intensity or aberration pattern by said adjusting means, and wherein said display is repeated for more than one level of said correction intensity and aberration pattern to determine the desired amount of correction.

36. The apparatus according to claim 34, wherein said image display device displays a plurality of images as they have been corrected for aberrations by said correcting means simultaneously for each adjustment of said correction intensity or aberration pattern to determine the desired amount of aberrational correction from among the displayed corrected images.

37. The apparatus according to claim 34, wherein said acquiring means selects an aberration characteristic from among a plurality of preliminarily provided aberration characteristics which have specified aberration patterns and intensities of aberrational correction.

38. The apparatus according to claim 34, wherein said acquiring means further includes a detecting means which specifies said subject to be corrected for aberrations from the displayed image, and detects the lateral chromatic aberration characteristic on the distortion characteristic due to said taking lens.

39. The apparatus according to claim 38, wherein said detecting means obtains at least two points of position information that specify the subject to be corrected, extracts said subject between said at least two points based on said input image data, acquires the position information of said subject before it is corrected for aberrations, said acquired corrected position information being predictable between said at least two points, and calculates an aberration equation based on that position information which has yet to be corrected for aberrations, and based on said acquired corrected position information.

40. The apparatus according to claim 39, wherein the position information of said subject to be corrected for aberrations is position information for an edge of said subject to be corrected.

* * * * *

UNITED STATES PATENT AND TRADEMARK OFFICE
CERTIFICATE OF CORRECTION

PATENT NO.    : 6,323,934 B1
DATED         : November 27, 2001
INVENTOR(S)   : Jun Enomoto It is certified that error appears in the above-identified patent and that said Letters Patent is hereby corrected as shown below:

<u>Column 42,</u>
Line 8, please delete "displayed" (second occurrence).

Signed and Sealed this

Twentieth Day of August, 2002

Attest:

Attesting Officer

JAMES E. ROGAN
*Director of the United States Patent and Trademark Office*